United States Patent
Miyazawa

(10) Patent No.: US 10,218,896 B2
(45) Date of Patent: Feb. 26, 2019

(54) FOCUS ADJUSTMENT DEVICE, FOCUS ADJUSTMENT METHOD, AND NON-TRANSITORY STORAGE MEDIUM STORING FOCUS ADJUSTMENT PROGRAM

(71) Applicant: Olympus Corporation, Hachioji-shi, Tokyo (JP)

(72) Inventor: Shingo Miyazawa, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/649,542

(22) Filed: Jul. 13, 2017

(65) Prior Publication Data

US 2018/0020151 A1 Jan. 18, 2018

(30) Foreign Application Priority Data

Jul. 14, 2016 (JP) .................................. 2016-139387

(51) Int. Cl.
*H04N 5/232* (2006.01)
*G02B 7/36* (2006.01)
*G03B 13/36* (2006.01)

(52) U.S. Cl.
CPC .......... *H04N 5/23212* (2013.01); *G02B 7/36* (2013.01); *G03B 13/36* (2013.01); *H04N 5/23219* (2013.01); *H04N 5/23222* (2013.01)

(58) Field of Classification Search
CPC .......... H04N 5/23212; H04N 5/23219; H04N 5/23222; G03B 3/10; G03B 13/00–13/36; G02B 7/04–7/105; G02B 7/28–7/285; G02B 7/36–7/38
See application file for complete search history.

(56) References Cited

U.S. PATENT DOCUMENTS

| 7,512,328 | B2* | 3/2009 | Suda | ....................... G03B 17/00 |
| | | | | 348/208.12 |
| 2007/0030381 | A1* | 2/2007 | Maeda | ................... G03B 13/36 |
| | | | | 348/345 |
| 2008/0278618 | A1* | 11/2008 | Matsumoto | ........ H04N 5/23212 |
| | | | | 348/345 |
| 2013/0170822 | A1* | 7/2013 | Chan | ....................... G03B 5/00 |
| | | | | 396/86 |

FOREIGN PATENT DOCUMENTS

JP 2009-008914 1/2009

* cited by examiner

*Primary Examiner* — Lin Ye
*Assistant Examiner* — Chriss S Yoder, III
(74) *Attorney, Agent, or Firm* — John C. Pokotylo; Pokotylo Patent Services

(57) ABSTRACT

A focus adjustment device includes a direction judgment unit and a control unit. A direction judgment unit calculates an evaluation value based on an image signal of a focus detection region, thereby judging a drive direction of a focus lens. The control unit controls a focus adjustment operation on the basis of the drive direction. The control unit causes the direction judgment unit to repeatedly judge the drive direction, and when the focus lens is slightly driven in a first direction judged on the basis of a first evaluation value and then the focus lens is slightly driven in a second direction judged on the basis of a subsequently calculated second evaluation value, the control unit forbids the slight driving of the focus lens in the first direction even though a drive direction judged on the basis of a further subsequently calculated third evaluation value is the first direction.

15 Claims, 22 Drawing Sheets

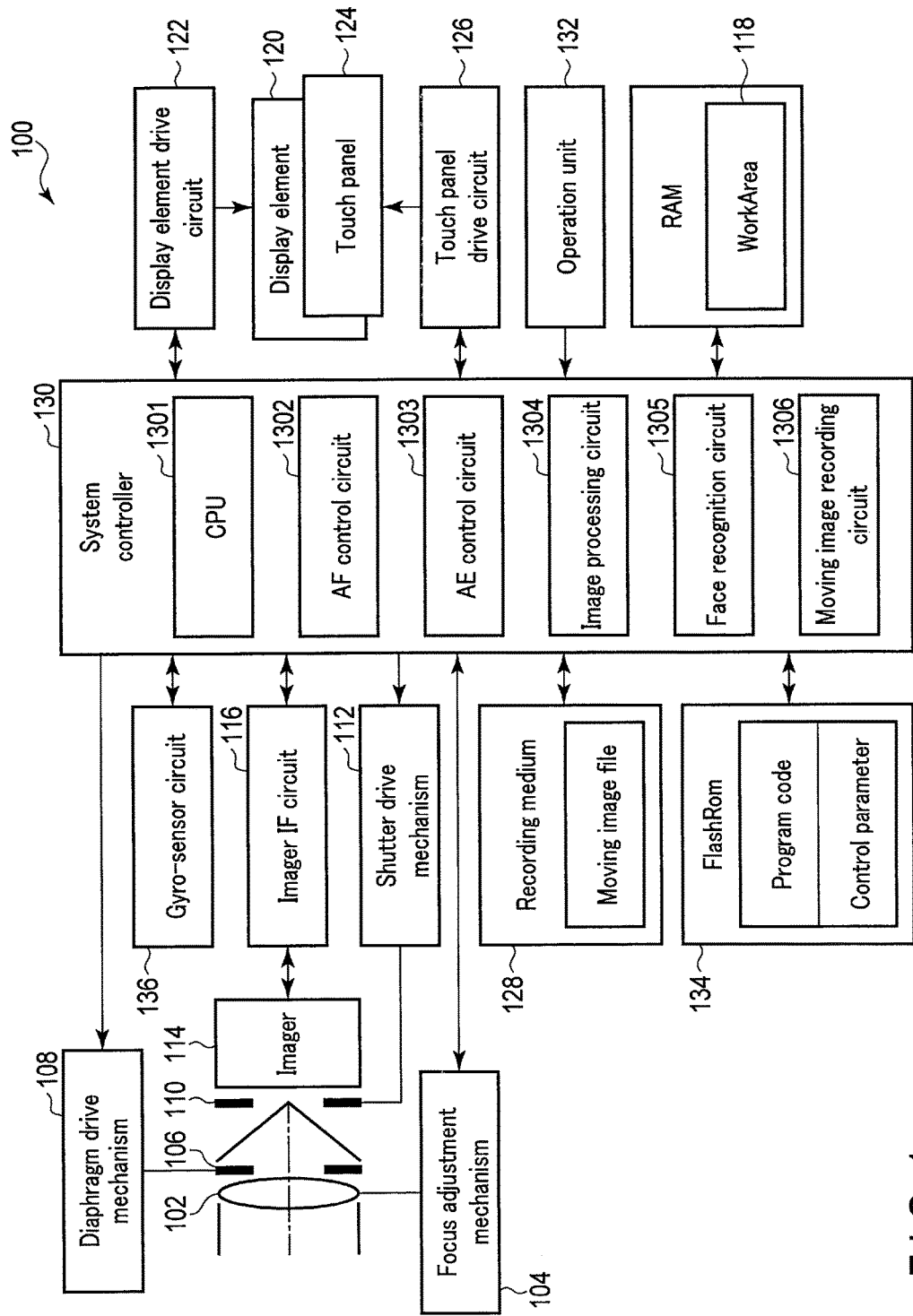
F I G. 1

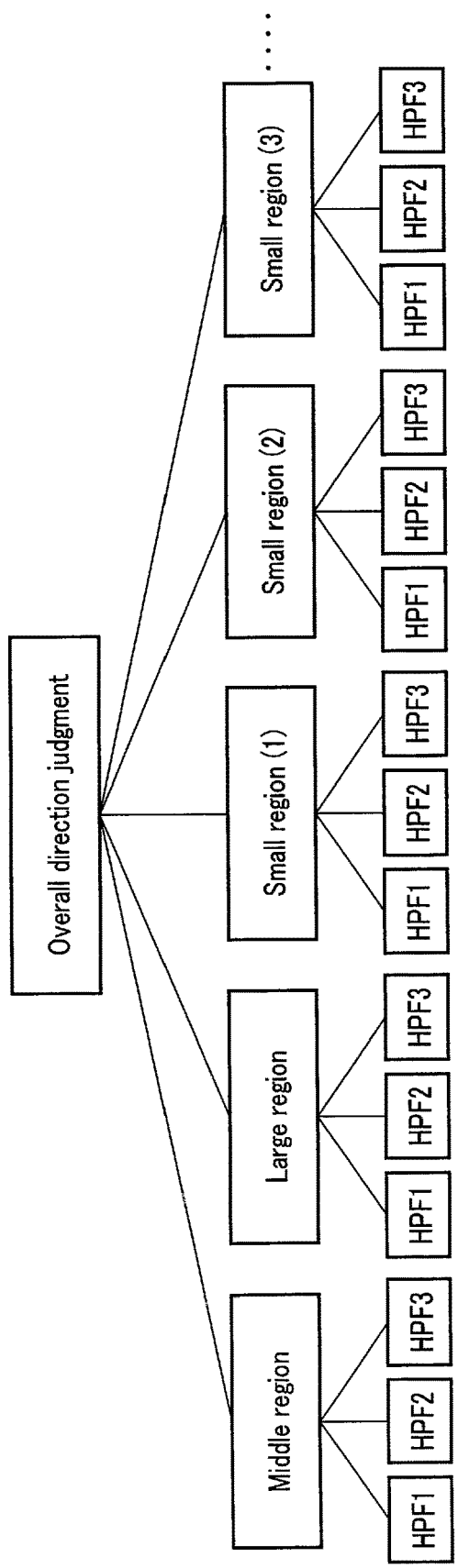
F I G. 5

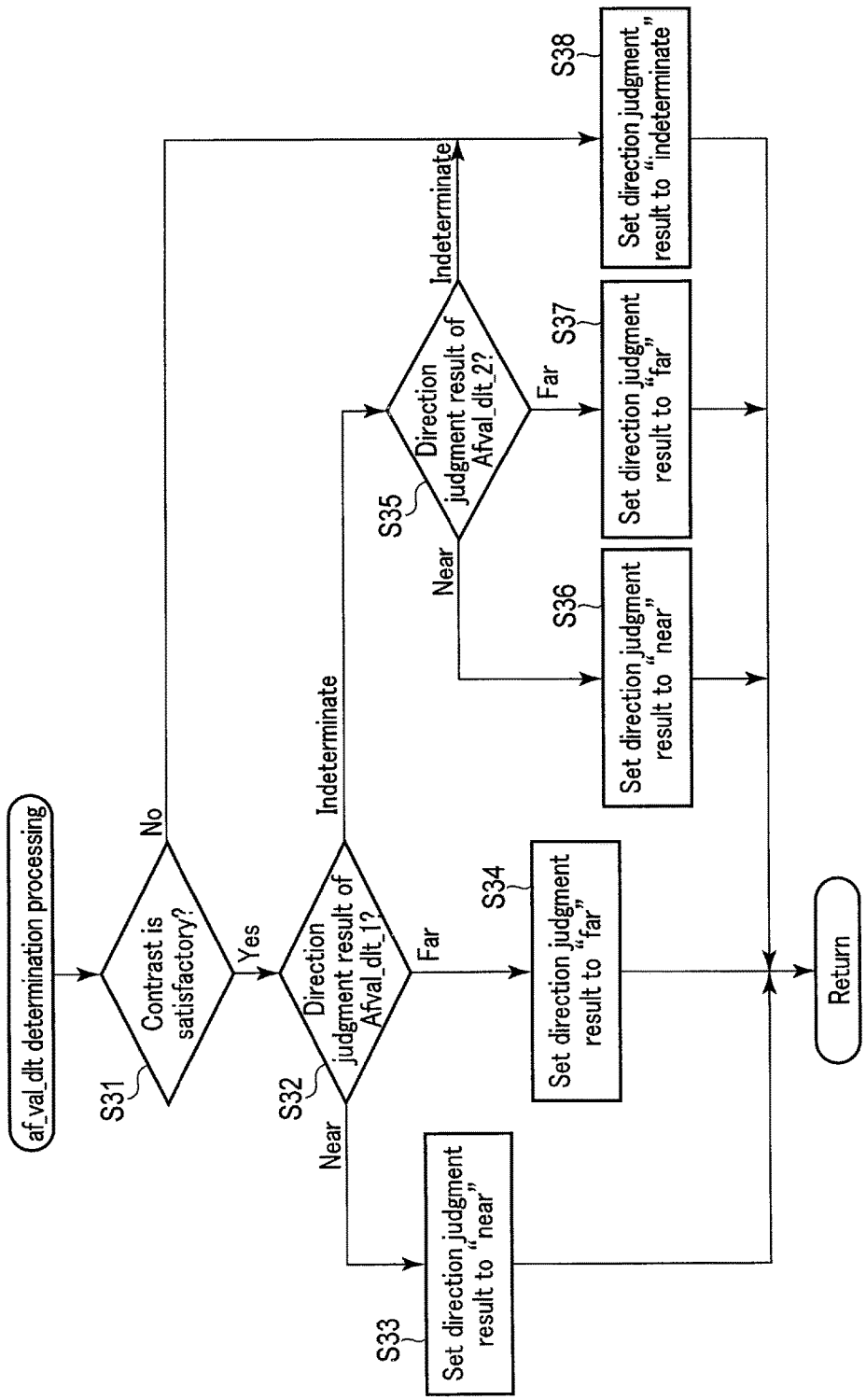
F I G. 9

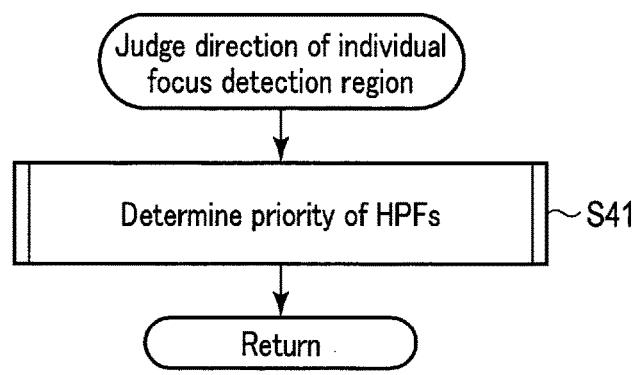
F I G. 10
| Priority | HPF1 | HPF2 | HPF3 |
|---|---|---|---|
| 1 | - | - | O |
| 2 | Same | Same | - |
| 3 | - | O | - |
| 4 | O | - | - |
F I G. 11

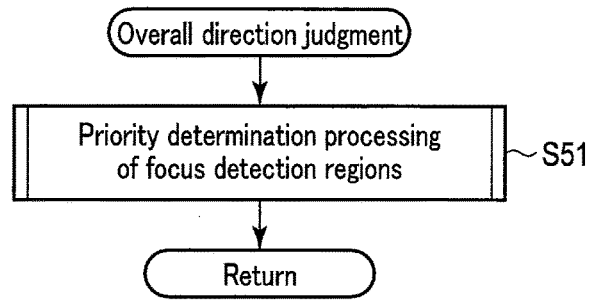
F I G. 12
| Priority | Focus detection regions | | Overall |
|---|---|---|---|
| | | Direction | Direction |
| 1 | (5) | Near | Near |
| 2 | (8) | Near | Near |
| 3 | (4) | Near | Near |
| 4 | (6) | Near | Near |
| 5 | (2) | Near | Near |
| 6 | (7) | Near | Near |
| 7 | (9) | Near | Near |
| 8 | (1) | Near | Near |
| 9 | (3) | Near | Near |
| 10 | Middle | Near | Near |
| 11 | (5) | Far | Far |
| 12 | (8) | Far | Far |
| 13 | (4) | Far | Far |
| 14 | (6) | Far | Far |
| 15 | (2) | Far | Far |
| 16 | (7) | Far | Far |
| 17 | (9) | Far | Far |
| 18 | (1) | Far | Far |
| 19 | (3) | Far | Far |
| 20 | Middle | Far | Far |
| 21 | Large | Near | Near |
| 22 | Large | Far | Far |
F I G. 13

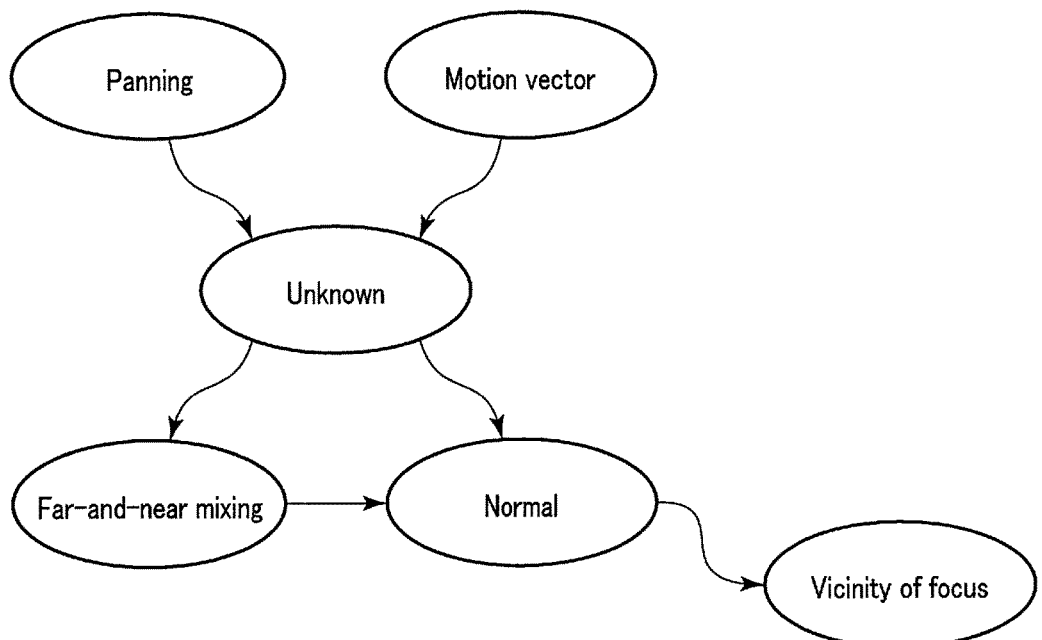
F I G. 14
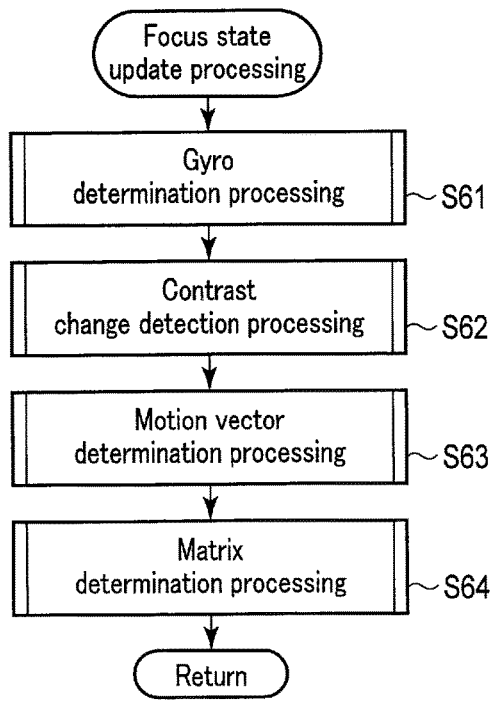
F I G. 15

| Contents of determination | Focus state | | | Transition destination |
|---|---|---|---|---|
| | Unknown | Normal | Far-and-near mixing | |
| Focus vicinity determination | - | ★ | - | Vicinity of focus |
| Normal subject determination | - | - | ★ | Normal |
| Far-and-near mixture determination | ★ | - | - | Far-and-near mixing or normal |

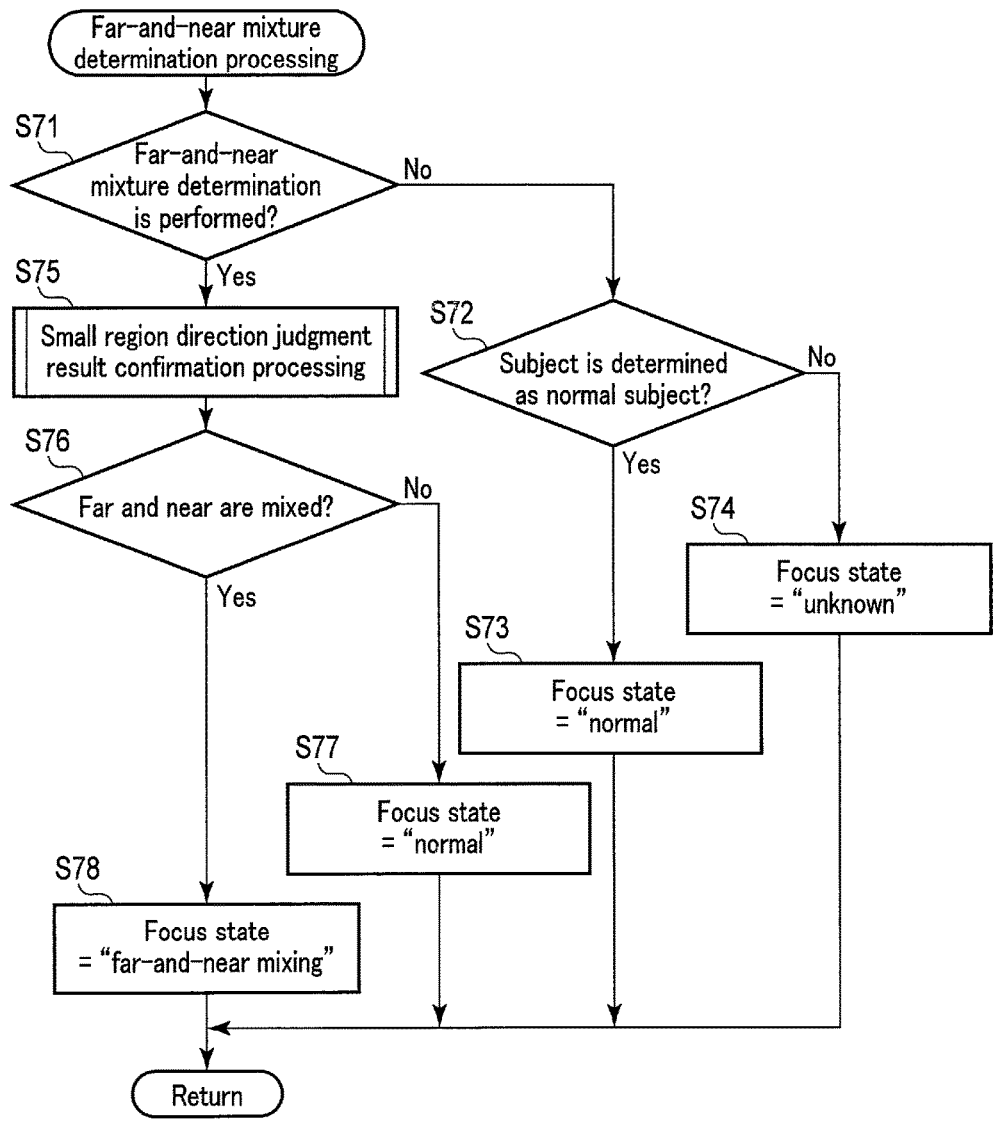
F I G. 19

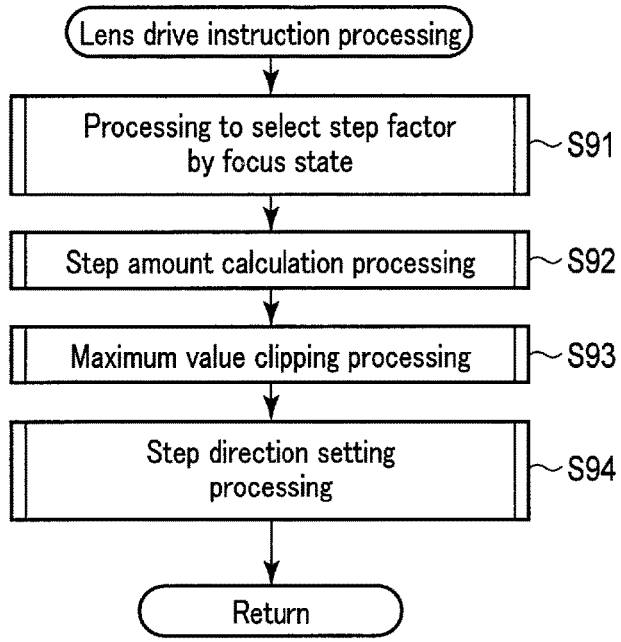
F I G. 21
| Focus state | Defocus amount | Image magnification variation |
|---|---|---|
| Unknown | 0.7Fδ | 0.0400% |
| Normal | 1~4Fδ | 0.1818% |
| Vicinity of focus | 0.5Fδ | 0.0400% |
| Panning | 1Fδ | 0.0400% |
| Far-and-near mixing | 1Fδ | 0.0400% |
F I G. 22

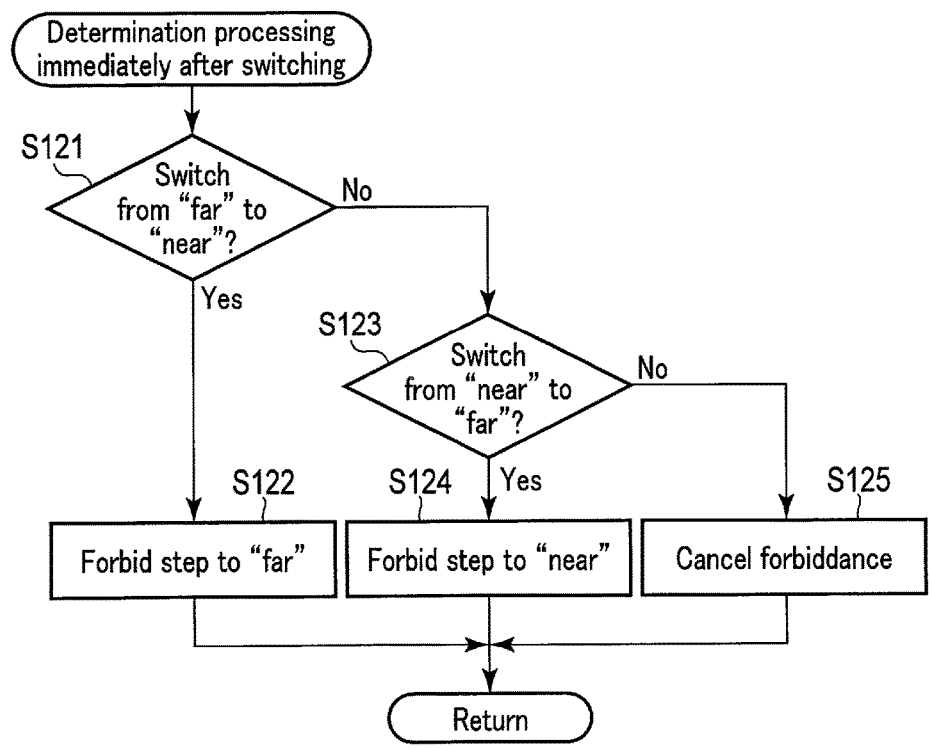
F I G. 24

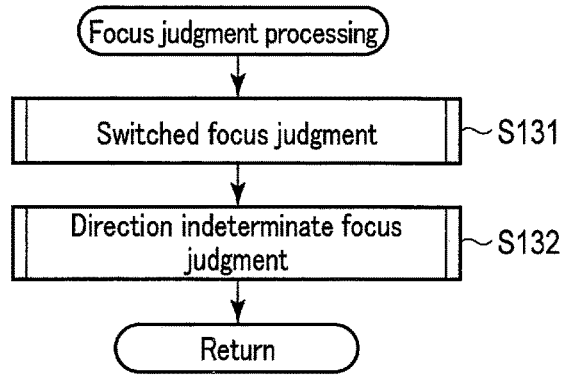
F I G. 25
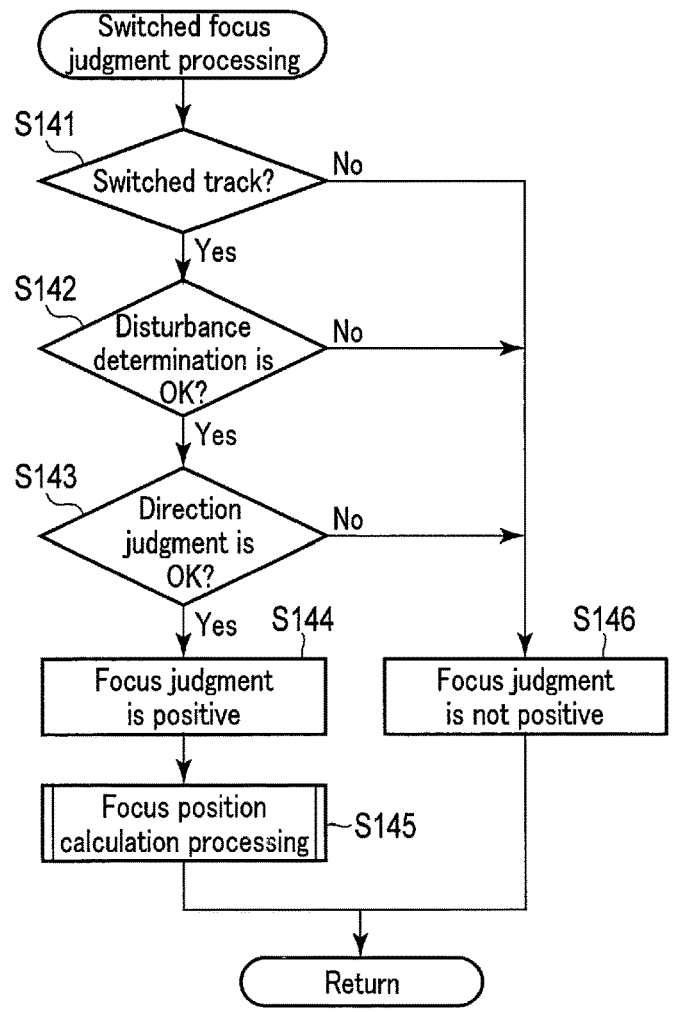
F I G. 26

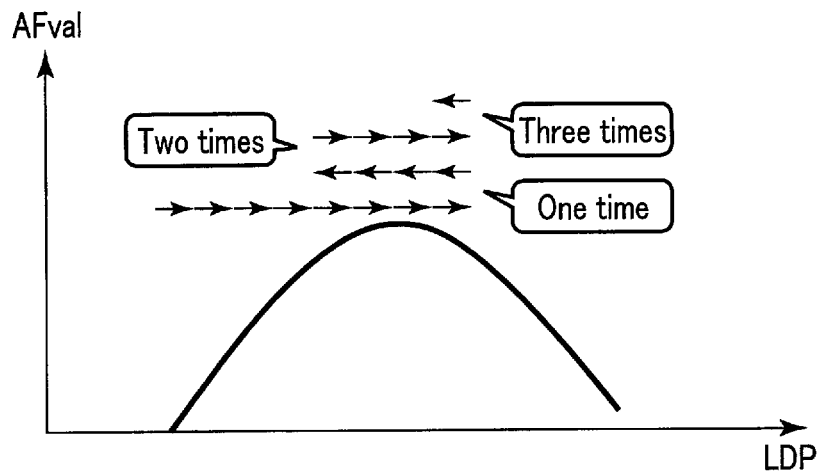
F I G. 28A
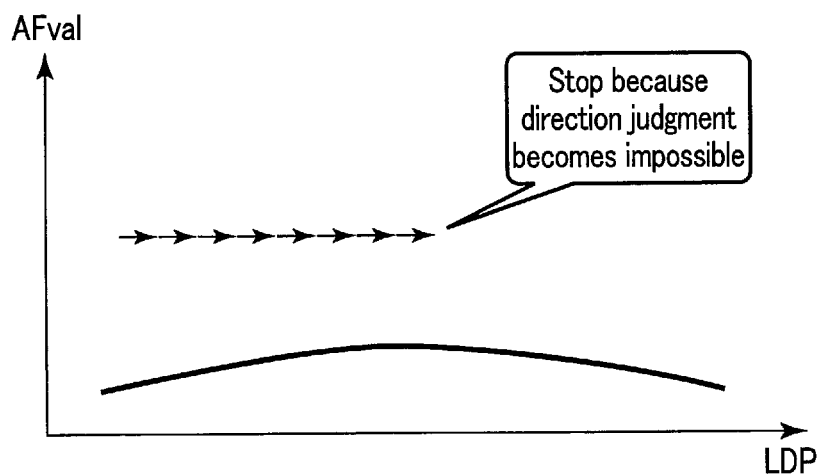
F I G. 28B

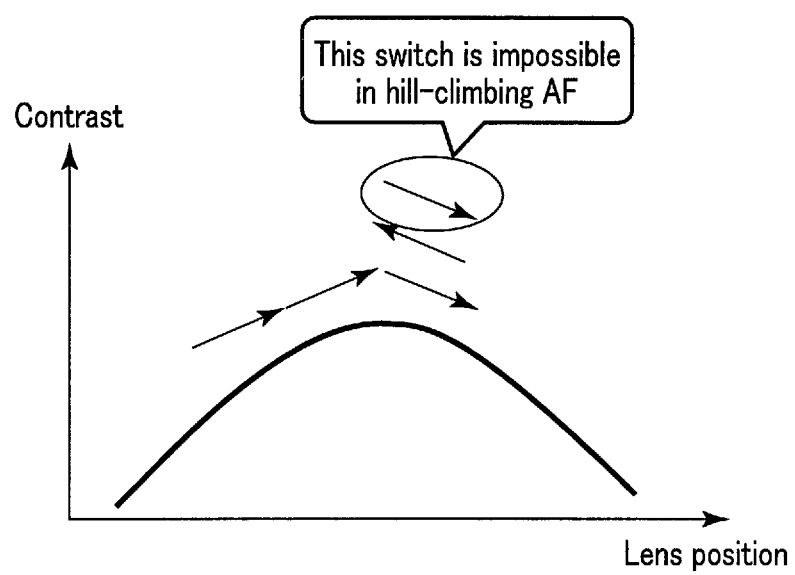
F I G. 30

FOCUS ADJUSTMENT DEVICE, FOCUS
ADJUSTMENT METHOD, AND
NON-TRANSITORY STORAGE MEDIUM
STORING FOCUS ADJUSTMENT PROGRAM

CROSS-REFERENCE TO RELATED
APPLICATIONS

This application is based upon and claims the benefit of priority from the prior Japanese Patent Application No. 2016-139387, filed Jul. 14, 2016, the entire contents of which are incorporated herein by reference.

BACKGROUND OF THE INVENTION

1. Field of the Invention

The present invention relates to a focus adjustment device, a focus adjustment method, and a non-transitory storage medium storing a focus adjustment program.

2. Description of the Related Art

As an automatic focus adjustment technique for an imaging lens provided in an imaging device, a contrast AF method is used. The contrast AF method is a method to adjust the focus of a focus lens on the basis of an evaluation value calculated from an image signal generated in accordance with a light flux received by an imager via an imaging lens. In such a contrast AF method, there are times when switch drive of the focus lens is needed. At the time of this switch drive, desired lens drive cannot be performed in some cases due to the influence of backlash in a drive mechanism of the focus lens. Jpn. Pat. Appln. KOKAI Publication No. 2009-8914 suggests measures against such an influence of backlash at the time of the focus lens drive. A driver of the lens in Jpn. Pat. Appln. KOKAI Publication No. 2009-8914 increases the drive amount after switching or increases the number of times of driving in accordance with a play amount (backlash amount) of a drive transmission mechanism of the focus lens.

BRIEF SUMMARY OF THE INVENTION

According to a first aspect of the invention, there is provided a focus adjustment device which includes an imager to receive a light flux passing through an imaging lens including a focus lens and then generate an image signal and which performs focus adjustment on the basis of the image signal, the focus adjustment device comprising: a direction judgment unit which calculates an evaluation value based on an image signal of a focus detection region set in a region of the imager where the light flux is received, thereby judging a drive direction of the focus lens to be in focus; and a control unit which controls a focus adjustment operation on the basis of the drive direction judged by the direction judgment unit, wherein the control unit causes the direction judgment unit to repeatedly judge the drive direction, and when the focus lens is slightly driven in a first direction judged on the basis of a first evaluation value and then the focus lens is slightly driven in a second direction different from the first direction on the basis of a subsequently calculated second evaluation value, the control unit forbids the slight driving of the focus lens in the first direction even though a drive direction judged on the basis of a further subsequently calculated third evaluation value is the first direction.

According to a second aspect of the invention, there is provided a focus adjustment method to perform focus adjustment on the basis of an image signal from an imager which receives a light flux passing through an imaging lens including a focus lens and then generates the image signal, the focus adjustment method comprising: calculating an evaluation value based on an image signal of a focus detection region set in a region of the imager where the light flux is received, thereby judging a drive direction of the focus lens to be in focus; and controlling a focus adjustment operation on the basis of the judged drive direction, wherein the drive direction is repeatedly judged, and when the focus lens is slightly driven in a first direction judged on the basis of a first evaluation value and then the focus lens is slightly driven in a second direction different from the first direction on the basis of a subsequently calculated second evaluation value, the slight driving of the focus lens in the first direction is forbidden even though a drive direction judged on the basis of a further subsequently calculated third evaluation value is the first direction.

According to a third aspect of the invention, there is provided a non-transitory storage medium storing a computer-readable focus adjustment program to be executed by a focus adjustment computer on the basis of an image signal from an imager which receives a light flux passing through an imaging lens including a focus lens and then generates the image signal, the focus adjustment program comprising: calculating an evaluation value based on an image signal of a focus detection region set in a region of the imager where the light flux is received, thereby judging a drive direction of the focus lens to be in focus; and controlling a focus adjustment operation on the basis of the judged drive direction, wherein the drive direction is repeatedly judged, and when the focus lens is slightly driven in a first direction judged on the basis of a first evaluation value and then the focus lens is slightly driven in a second direction different from the first direction on the basis of a subsequently calculated second evaluation value, the slight driving of the focus lens in the first direction is forbidden even though a drive direction judged on the basis of a further subsequently calculated third evaluation value is the first direction.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL
VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of an example of an imaging device as an application example of a focus adjustment device according to one embodiment of the present invention;

FIG. 5 is a conceptual diagram of direction judgment processing;

FIG. 9 is a flowchart showing af_val_dlt determination processing;

FIG. 10 is a flowchart showing direction judgment processing in individual focus detection region;

FIG. 11 is a diagram showing a table used in priority determination processing of HPFs;

FIG. 12 is a flowchart showing overall direction judgment processing;

FIG. 13 is a diagram showing a table used in priority determination processing of the focus detection regions;

FIG. 14 is a state transition diagram of a focus state;

FIG. 15 is a flowchart showing focus state update processing;

FIG. 19 is a flowchart showing far-and-near mixture determination processing;

FIG. 21 is a flowchart showing lens drive processing;

FIG. 22 is a diagram showing a table that shows the correspondence between the focus states and step factors;

FIG. 24 is a flowchart showing determination processing immediately after switching;

FIG. 25 is a flowchart showing focus judgment processing;

FIG. 26 is a flowchart showing switched focus judgment processing;

FIG. 28A is a diagram showing a contrast curve in the case where the switched focus judgment processing is applied;

FIG. 28B is a diagram showing a contrast curve in the case where the direction indeterminate focus judgment processing is applied;

Figure 29A:
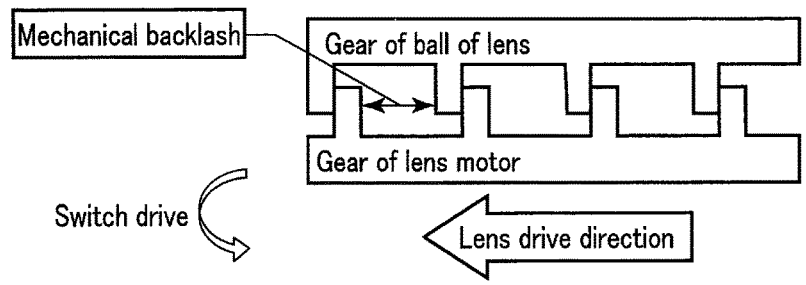
Figure 29B:
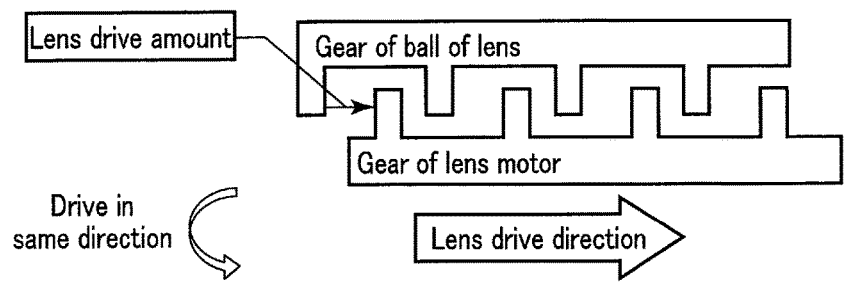
Figure 29C:
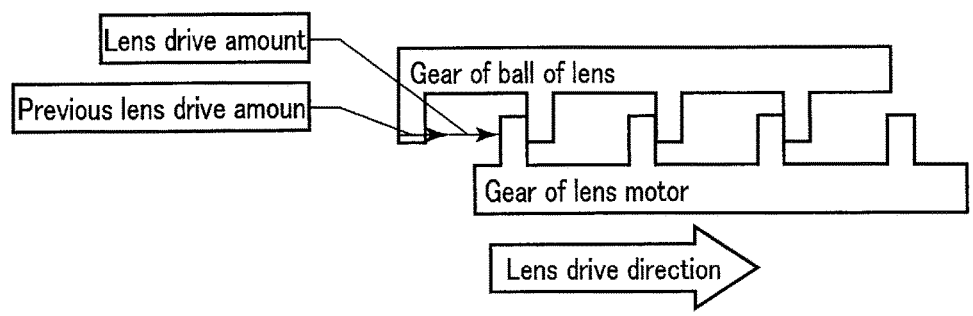

FIG. 29A, FIG. 29B, and FIG. 29C are diagrams to illustrate advantageous effects in one embodiment of the present invention; and FIG. 30 is a diagram to illustrate advantageous effects in one embodiment of the present invention.

DETAILED DESCRIPTION OF THE INVENTION

Hereinafter, an embodiment of the present invention will be described with reference to the drawings. FIG. 1 is a block diagram showing the configuration of an example of an imaging device as an application example of a focus adjustment device according to one embodiment of the present invention. The imaging device includes devices such as digital cameras and smartphones as well as various imaging devices having focus lenses.

As shown in FIG. 1, an imaging device 100 includes an imaging lens 102, a focus adjustment mechanism 104, a diaphragm 106, a diaphragm drive mechanism 108, a shutter 110, a shutter drive mechanism 112, an imager 114, an imager interface (IF) circuit 116, a RAM 118, a display element 120, a display element drive circuit 122, a touch panel 124, a touch panel drive circuit 126, a recording medium 128, a system controller 130, an operation unit 132, a flash ROM 134, and a gyro-sensor circuit 136.

The imaging lens 102 is an optical system to guide a light flux from an unshown subject to a light receiving surface of the imager 114. The imaging lens 102 includes a focus lens. The focus lens is a lens to change the focus position of the imaging lens 102. The imaging lens 102 may be configured as a zoom lens. The imaging lens 102 may otherwise be configured to be attachable to and detachable from the imaging device 100.

The focus adjustment mechanism 104 includes a drive mechanism to drive the focus lens. The focus adjustment mechanism 104 drives the focus lens in its optical axis direction (chain line direction shown in the drawing) under the control of an AF control circuit 1302 of the system controller 130.

The diaphragm 106 adjusts the amount of the light flux that enters the imager 114 via the imaging lens 102.

The diaphragm drive mechanism 108 includes a drive mechanism to drive the diaphragm 106. The diaphragm drive mechanism 108 drives the diaphragm 106 under the control of a CPU 1301 of the system controller 130.

The shutter 110 is configured to allow the light receiving surface of the imager 114 to be blocked from light or exposed to light. The shutter 110 adjusts the exposure time of the imager 114 by the time in which the light receiving surface of the imager 114 is blocked from light.

The shutter drive mechanism 112 includes a drive mechanism to drive the shutter 110. The shutter drive mechanism 112 drives the shutter 110 under the control of the CPU 1301 of the system controller 130.

The imager 114 includes a light receiving surface to receive the light flux guided via the imaging lens 102. Two-dimensionally arranged pixels are provided in the light receiving surface of the imager 114. A color filter is provided on the light entrance side of the light receiving surface. This imager 114 generates an electric signal (hereinafter referred to as an image signal) corresponding to the light flux received in the light receiving surface.

The imager IF circuit 116 drives the imager 114 under the control of the CPU 1301 of the system controller 130. The imager IF circuit 116 also reads the image signal obtained in the imager 114, under the control of the CPU 1301 of the system controller 130. The imager IF circuit 116 then subjects the read image signal to analog processing such as correlated double sampling (CDS) processing and automatic gain control (AGC) processing. Further, the imager IF circuit 116 generates a digital signal (hereinafter referred to as image data) based on the analog-processed image signal.

The RAM 118 is, for example, an SDRAM, and has a work area. The work area is the storage area to temporarily store data generated in each part of the imaging device 100.

The display element 120 is, for example, a liquid crystal display (LCD). The display element 120 displays various images. The display element drive circuit 122 drives the display element 120 on the basis of the image data input from the CPU 1301 of the system controller 130.

The touch panel 124 is integrally formed on the display screen of the display element 120, and detects the position where the finger or the like of a user touches the display screen. The touch panel drive circuit 126 drives the touch panel 124, and outputs a touch detection signal from the touch panel 124 to the CPU 1301 of the system controller 130. The CPU 1301 detects a touch operation on the display screen by the user from the touch detection signal, and performs processing corresponding to the touch operation.

The recording medium 128 is, for example, a memory card. Moving image files obtained by moving image photography operation are recorded in the recording medium 128.

The system controller 130 includes, as control circuits to control the operation of the imaging device 100, the CPU 1301, the AF control circuit 1302, an AE control circuit 1303, an image processing circuit 1304, a face recognition circuit 1305, and a moving image recording circuit 1306. Functions similar to those of the system controller 130 may be obtained by software.

The CPU 1301 controls the operation of each of the blocks outside the system controller 130: the diaphragm drive mechanism 108, the shutter drive mechanism 112, the display element drive circuit 122, the touch panel drive circuit 126, and others, and the operation of each of the control circuits in the system controller 130.

The AF control circuit 1302 as a focus detector controls AF processing by a contrast AF method. The AF control circuit 1302 has a function of a direction judgment unit, and a function of a control unit. The AF control circuit 1302 sets focus detection regions in the image data. The AF control circuit 1302 then calculates evaluation values from the image data for the focus detection regions sequentially obtained via the imager 114 in response to the driving of the focus lens. The evaluation values are obtained, for example, by high pass filtering (HPF) of the image data in the focus detection regions. The AF control circuit 1302 judges the drive direction of the focus lens to be in focus on the basis of the evaluation values, and drives the focus lens to the focus position in accordance with the direction judgment result.

The AE control circuit 1303 controls AE processing on the basis of a subject luminance obtained from the image data or the like.

The image processing circuit 1304 performs various kinds of image processing for the image data. The image processing includes color correction processing, gamma (γ) correction processing, compression processing, and the like. The image processing circuit 1304 also decompresses compressed image data.

The face recognition circuit 1305 recognizes the face of a person in the image data by use of, for example, template matching. The AF processing and the AE processing can be performed on the basis of the face recognition result.

The moving image recording circuit 1306 controls the operation of moving image recording.

The operation unit 132 includes various operation members to be operated by the user. The operation unit 132 includes, for example, a release button, a moving image button, a mode button, a selection key, and a power button. The release button is an operation member to issue an instruction for still image photography. The moving image button is an operation member to issue an instruction for moving image photography. The mode button is an operation member to select photography setting of the imaging device 100. The selection key is an operation member to select or decide an item on, for example, a menu screen. The power button is an operation member to power on or off the imaging device.

The flash ROM 134 stores a program code for the CPU 1301 to perform various kinds of processing. The flash ROM 134 also stores various control parameters; for example, control parameters necessary for the operations of the imaging lens 102, the diaphragm 106, and the imager 114, and a control parameter necessary for the image processing in the image processing circuit 1304.

The gyro-sensor circuit 136 is a sensor to detect the posture change of the imaging device 100. The gyro-sensor circuit 136 detects the posture change of the imaging device 100, for example, by detecting an angular velocity generated in the imaging device 100.

The operation of the imaging device 100 as an application example of the focus adjustment device according to the present embodiment is described below. The operation described below is an operation during moving image AF which is AF processing during moving image recording. Naturally, the imaging device 100 may also be configured to be capable of still image recording.

Figure 2:
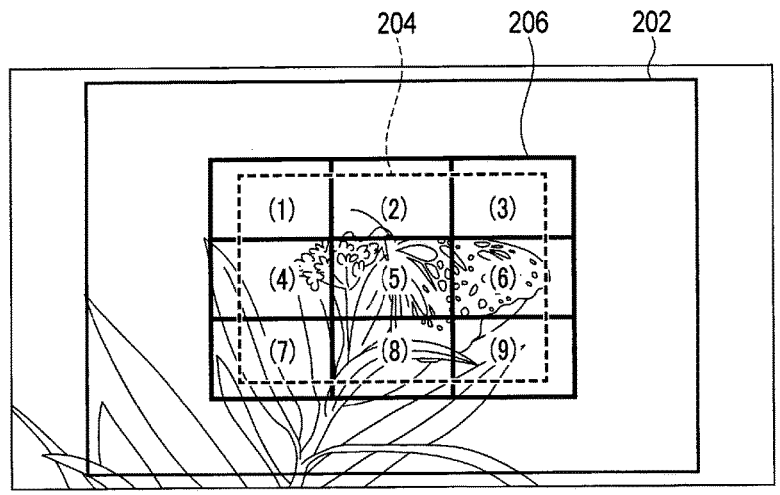
FIG. 2 is a diagram showing a large region, a middle region, and each of small regions.

In the present embodiment, the evaluation values are respectively calculated for a large region, a middle region, and small regions which are the focus detection regions set in a screen. FIG. 2 is a diagram showing the large region, the middle region, and each of the small regions. A large region 202 is set in the screen to have a predetermined size decided in consideration of the load of computation and the like. A middle region 204 at least partly overlaps the large region 202, and is set in the screen to have a size smaller than that of the large region 202. Small regions 206 at least partly overlap the large region 202 and the middle region 204, and are set in the screen to have a size smaller than that of the middle region 204. In FIG. 2, the large region 202 is set in the center of the screen. The middle region 204 is set inside the large region 202. Moreover, the small regions 206 are set in the upper left, upper center, upper right, middle left, middle center, middle right, lower left, lower center, and lower right of the middle region 204, respectively. In FIG. 2, the respective small regions are provided with the numbers (1) to (9).

Figure 3:
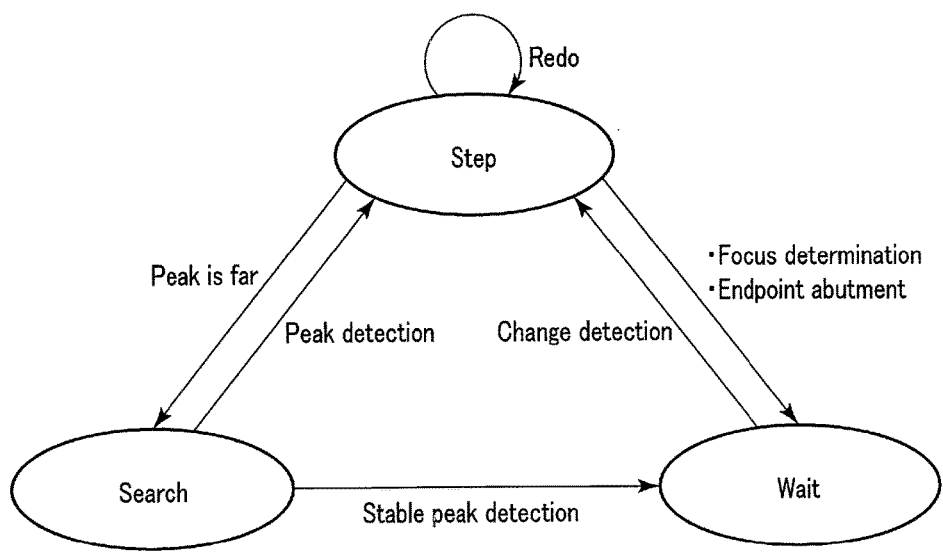
FIG. 3 is a diagram showing an overview of processing during moving image AF.

FIG. 3 is a diagram showing an overview of the processing during the moving image AF in the present embodiment. In the processing during the moving image AF by the imaging device in the present embodiment, the state makes the transition between three control phases comprising a "step phase", a "search phase", and a "wait phase". The step phase is a phase to drive the focus lens to the focus position by using both a slight amount of relative drive of the focus lens in one (first direction) of a near direction and a far direction and a slight amount of relative drive of the focus lens in a direction (second direction) opposite to the first direction. The step phase will be described later in detail. The search phase is a phase to drive the focus lens to the focus position while continuously driving the focus lens in the near direction or the far direction. The wait phase is a phase to wait for processing without driving the focus lens.

In the step phase, when it is determined that the lens position of the focus lens is far from the focus position, that is, when it is determined that a peak position of the evaluation value is far, the control phase makes the transition to the search phase. By the transition to the search phase, the focus lens rapidly moves to the vicinity of the focus position. In contrast, in the step phase, when it is determined that the lens position is the focus position, that is, when it is determined that a peak of the evaluation value is detected, the control phase makes the transition to the wait phase, and the lens drive is stopped. In the step phase, when it is determined that the focus lens has reached the focus position as well, the control phase makes the transition to the wait phase, and the lens drive is stopped.

In the search phase, when it is determined that the lens position is in the vicinity of the focus position, that is, when it is judged that the lens position is in the vicinity of the peak of the evaluation value, the control phase makes the transition to the step phase. Then the focus lens is moved to the focus position by step drive. In contrast, in the search phase, when it is determined that the lens position is the focus position, that is, when it is determined that the evaluation value has reached the peak and stable, the control phase makes the transition to the wait phase, and the lens drive is stopped.

In the wait phase, when the movement of the imaging device 100 is detected or when there is a change in, for example, the contrast of the image or in face information, that is, when a change in the condition of the imaging device or the subject is detected, the control phase makes the transition to the step phase. In this instance, the step drive is started so that the focus lens will be in focus.

Figure 4:
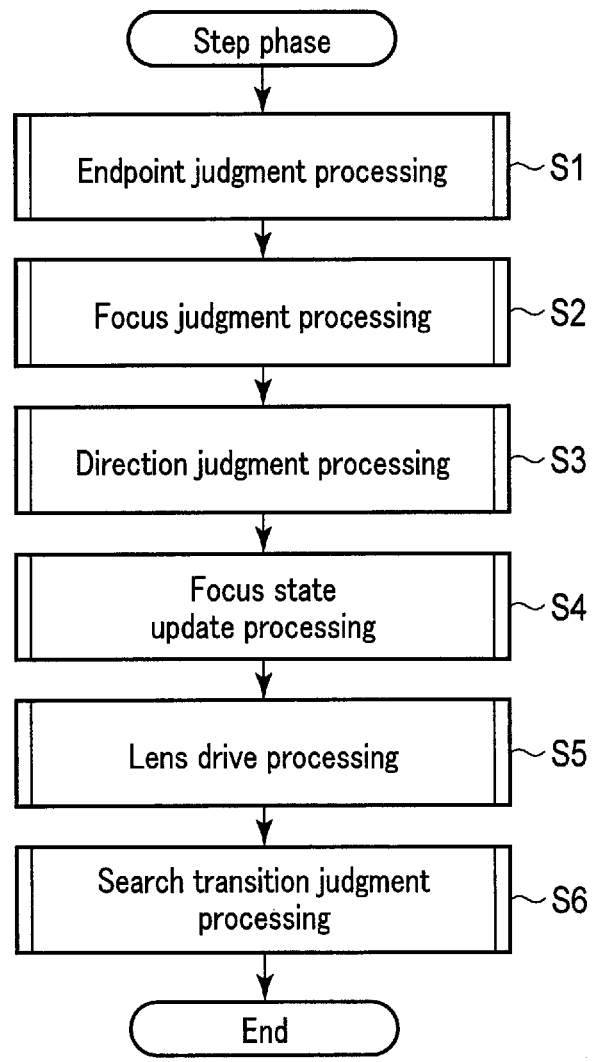
FIG. 4 is a flowchart showing overall processing in a step phase.

The step phase is further described below. FIG. 4 is a flowchart showing overall processing in the step phase. The processing in FIG. 4 is performed every frame of the moving image recording by the AF control circuit 1302, for example, after the moving image button is pushed by the user. The processing described below may be performed by a circuit other than the AF control circuit 1302 of the CPU 1301 or the like. The processing described below may be performed not only by a specific circuit but also by distributed processing.

In step S1, the AF control circuit 1302 performs endpoint judgment processing. In the endpoint judgment processing, the AF control circuit 1302 judges whether the current position of the focus lens is an endpoint position. When judging that the current position of the focus lens is an endpoint position on a near side or a far side, the AF control circuit 1302 judges whether to shift the processing to the wait phase or leave the processing in the step phase. For example, when the focus lens is not brought into focus even after the number of the executions of the step phase is beyond a predetermined number, the AF control circuit 1302 judges that the processing is to be shifted to the wait phase. When a change in the subject condition is detected in the wait phase, the AF control circuit 1302 shifts the processing to the step phase. The change in the subject condition is, for example, the change of contrast, the change of a motion vector, or the change of the movement of the imaging device 100.

When judging that the current position of the focus lens is not the endpoint position or that the step phase is to be continued, the AF control circuit 1302 shifts the processing to step S2. In step S2, the AF control circuit 1302 performs focus judgment processing. When the focus judgment is positive in the focus judgment processing, the AF control circuit 1302 allows the processing to make the transition to the wait phase. Details of the focus judgment processing will be described later.

When the focus judgment is negative in the focus judgment processing, the AF control circuit 1302 shifts the processing to step S3. In step S3, the AF control circuit 1302 performs direction judgment processing. The direction judgment processing is processing to judge the drive direction of the focus lens as the whole focus detection region. The direction judgment processing will be described later in detail.

In step S4, the AF control circuit 1302 performs focus state update processing. The processing then shifts to step S5. The focus state update processing is processing to update the current focus state in the moving image AF. In the present embodiment, different processing dependent on the focus state is performed. The focus state update processing will be described later in detail.

In step S5, the AF control circuit 1302 performs lens drive processing. The processing then shifts to step S6. The lens drive processing is processing to perform lens drive for focusing. The lens drive processing will be described later in detail.

In step S6, the AF control circuit 1302 performs search transition judgment processing. The processing in FIG. 4 then ends. In the search transition judgment processing, the AF control circuit 1302 judges whether to shift the control phase to the search phase, by the history of the past direction judgment results and the history of lens drive and the like. For example, when determining that the number of the switch of the drive direction of the focus lens in the step phase is beyond a threshold, the AF control circuit 1302 judges that the control phase is to be shifted to the search phase. When determining that the position of the focus lens is in the vicinity of the focus position in the search phase, the AF control circuit 1302 shifts the processing to the step phase. When it is judged that the control phase is not to be shifted to the search phase in the search transition judgment processing, the processing returns to step S1.

Next, the direction judgment processing is described. FIG. 5 is a conceptual diagram of the direction judgment processing. The direction in which the focus lens is to be driven is decided on the basis of the direction judgment result obtained in each of the focus detection regions: the large region 202, the middle region 204, and the nine small regions 206. As shown in FIG. 5, in each of the eleven focus detection regions, the drive direction of the focus lens is judged on the basis of the evaluation value obtained by three kinds of high pass filtering (HPF). Thus, the direction judgment processing in the present embodiment is hierarchically performed. Hereinafter, the three kinds of HPFs are referred to as HPF1, HPF2, and HPF3 in ascending order of cut-off frequency.

Figure 6:
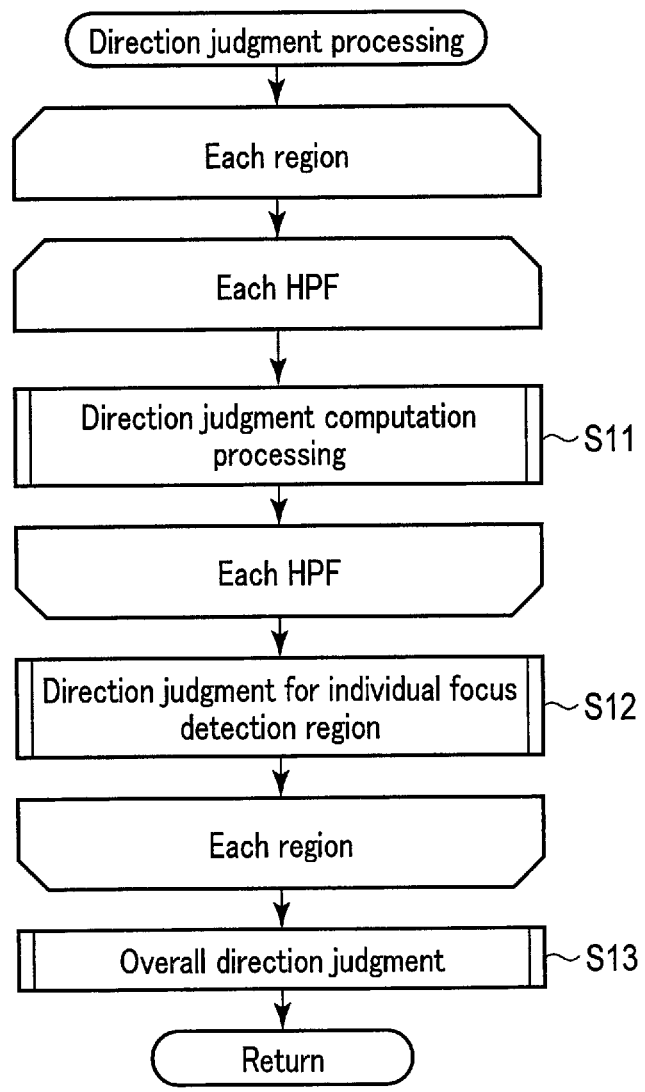
FIG. 6 is a flowchart showing an example of the direction judgment processing.

FIG. 6 is a flowchart showing an example of the direction judgment processing. First, the AF control circuit 1302 performs loop processing for each of the focus detection regions. For example, the focus detection regions are selected in the order from the upper right small region to the lower left small region, and then selected in the order of the middle region and the large region. The selecting order of the focus detection regions may be a different selecting order.

In the loop processing for each of the focus detection regions, the AF control circuit 1302 performs loop processing for each of the HPFs. The HPFs are selected, for example, in the order of the HPF1, the HPF2, and the HPF3. The selecting order of the HPFs may be a different selecting order.

Figure 7:
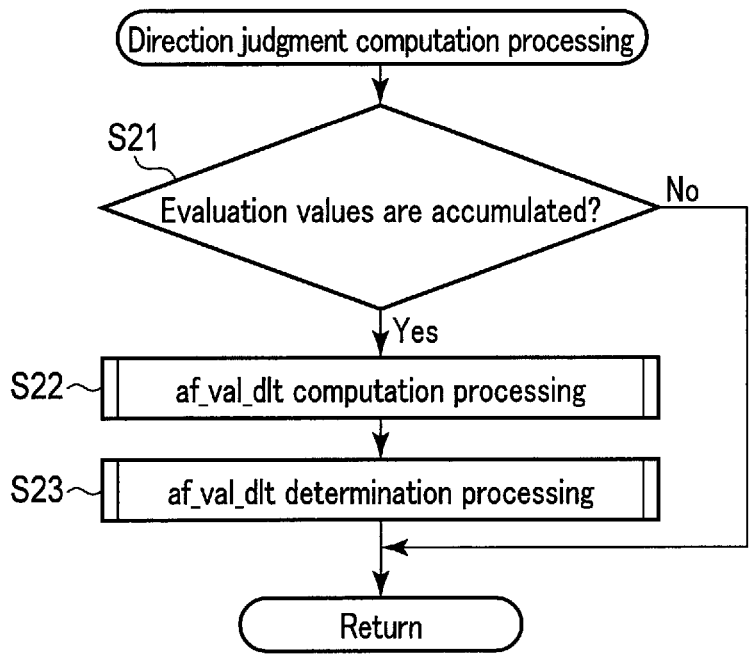
FIG. 7 is a flowchart showing direction judgment computation processing.

In step S11 which is the start of the processing for each of the HPFs, the AF control circuit 1302 performs direction judgment computation processing. The direction judgment computation processing is described. FIG. 7 is a flowchart showing the direction judgment computation processing. In step S21, the AF control circuit 1302 determines whether the number of evaluation values necessary for the computation of the direction judgment is accumulated. By way of example, at least two frames of evaluation values are needed for the computation of the direction judgment. However, there is a possibility that the direction judgment cannot be made with evaluation values of two frames, so that in the present embodiment, the direction judgment is made with evaluation values of three frames. When it is determined in step S21 that the number of evaluation values necessary for the computation of the direction judgment is not accumulated, the processing in FIG. 7 then ends. When it is determined in step S21 that the number of evaluation values necessary for the computation of the direction judgment is accumulated, the processing shifts to step S22.

In step S22, the AF control circuit 1302 performs af_val_dlt computation processing. The processing then shifts to step S23. The af_val_dlt computation processing is processing to compute a difference between evaluation values Afval[n−1] and Afval[n] (n is a frame number), and a difference between evaluation values Afval[n−2] and Afval [n], that is, Afval_dlt_1 and Afval_dlt_2 in (Equation 1) below. Although the differences between the evaluation value of the current frame and the evaluation values up to the second last frame are computed here, the differences between the evaluation value of the current frame and the evaluation values up to the third last frame and the frames before that may be computed.

$$Afval\_dlt\_1 = Afval[n] - Afval[n-1]$$

$$Afval\_dlt\_2 = Afval[n] - Afval[n-2] \quad \text{(Equation 1)}$$

Figure 8:
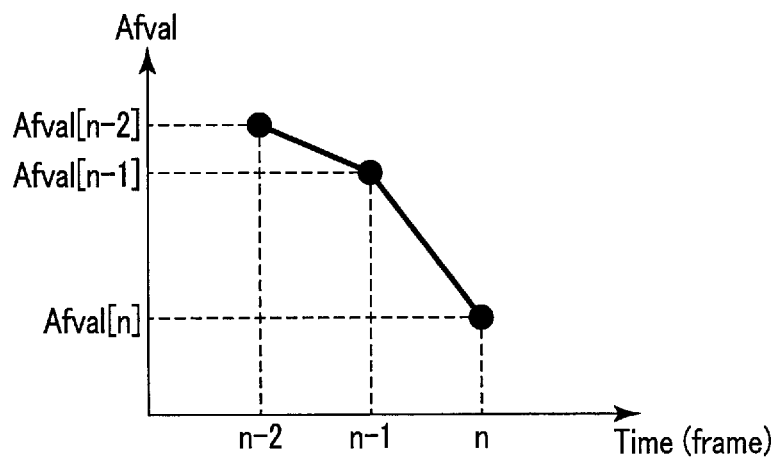
FIG. 8 is a graph showing the relation between the elapse of time (frame) and the change of an evaluation value in the case where the state is not a far-and-near mixing state.

FIG. 8 shows the relation between the elapse of time (frame) and the change of the evaluation value. Evaluation values are sequentially acquired while the focus lens is moved in the same direction. Thus, when the contrast of the subject is correctly acquired and when the focus lens is not in the vicinity of focus, the evaluation values monotonously increase or monotonously decrease in accordance with the elapse of time, that is, the change of the position of the focus lens, as shown in FIG. 8.

In step S23, the AF control circuit 1302 performs af_val_dlt determination processing. The processing in FIG. 7 then ends. The af_val_dlt determination processing is processing to judge the drive direction of the focus lens in the currently selected focus detection region. The af_val_dlt determination processing in step S23 is described. FIG. 9 is a flowchart showing the af_val_dlt determination processing.

In step S31, the AF control circuit 1302 determines whether the contrast of the subject is satisfactory. For example, if the magnitude of the evaluation value is equal to or more than a threshold, it is determined that the contrast of the subject is satisfactory. When it is determined in step S31 that the contrast of the subject is satisfactory, the processing shifts to step S32. When it is determined in step S31 that the contrast of the subject is not satisfactory, the processing shifts to step S38.

In step S32, the AF control circuit 1302 makes the direction judgment from the absolute value and sign of the difference Afval_dlt_1 of the evaluation values. First, when the absolute value of the difference Afval_dlt_1 of the evaluation values is out of a range exceeding a predetermined direction judgment reference value, the direction judgment is not determined. In this case, the processing shifts to step S35. In contrast, when the absolute value of the difference Afval_dlt_1 of the evaluation values is within the range exceeding the direction judgment reference value and when the sign of the difference Afval_dlt_1 of the evaluation values is positive, the direction judgment result is the same direction as the drive direction of the focus lens immediately before the current af_val_dlt determination processing. That is, when the focus lens is driven from the far side to the near side, the direction judgment result is "far to near (far)". When the focus lens is driven from the nearside to the far side, the direction judgment result is "near to far (near)". Moreover, when the absolute value of the difference Afval_dlt_1 of the evaluation values is within a range fixed by the direction judgment reference value and when the sign of the difference Afval_dlt_1 of the evaluation values is negative, the direction judgment result is opposite to the drive direction of the focus lens immediately before the current af_val_dlt determination processing. That is, when the focus lens is driven from the far side to the near side, the direction judgment result is "far". When the focus lens is driven from the near side to the far side, the direction judgment result is "near". When it is determined in step S32 that the direction judgment result is "near", the processing shifts to step S33. When it is determined in step S32 that the direction judgment result is "far", the processing shifts to step S34.

In step S33, the AF control circuit 1302 sets the direction judgment result for the currently selected evaluation value of the currently selected focus detection region to "near". The processing in FIG. 9 then ends, and the processing shifts to the determination of the end of the loop processing for the HPF in FIG. 6. In step S34, the AF control circuit 1302 sets the direction judgment result for the currently selected evaluation value of the currently selected focus detection region to "far". The processing in FIG. 9 then ends, and the processing shifts to the determination of the end of the loop processing for the HPF in FIG. 6.

In step S35, the AF control circuit 1302 makes a direction judgment from the absolute value and sign of the difference Afval_dlt_2 of the evaluation values. As in the judgment using the difference Afval_dlt_1 of the evaluation values, when the absolute value of the difference Afval_dlt_2 of the evaluation values is out of a range exceeding a predetermined direction judgment reference value, the direction judgment is not determined. In this case, the processing shifts to step S38. In contrast, when the absolute value of the difference Afval_dlt_2 of the evaluation values is within the range exceeding the direction judgment reference value and when the sign of the difference Afval_dlt_2 of the evaluation values is positive, the direction judgment result is the same direction as the drive direction of the focus lens immediately before the current af_val_dlt determination processing. That is, when the focus lens is driven from the far side to the near side, the direction judgment result is "far to near (far)". When the focus lens is driven from the nearside to the far side, the direction judgment result is "near to far (near)". Moreover, when the absolute value of the difference Afval_dlt_2 of the evaluation values is within a range fixed by the direction judgment reference value and when the sign of the difference Afval_dlt_2 of the evaluation values is negative, the direction judgment result is opposite to the drive direction of the focus lens immediately before the current af_val_dlt determination processing. That is, when the focus lens is driven from the far side to the near side, the direction judgment result is "far". When the focus lens is driven from the near side to the far side, the direction judgment result is "near". When it is determined in step S35 that the direction judgment result is "near", the processing shifts to step S36. When it is determined in step S35 that the direction judgment result is "far", the processing shifts to step S37.

In step S36, the AF control circuit 1302 sets the direction judgment result for the currently selected evaluation value of the currently selected focus detection region to "near". The processing in FIG. 9 then ends, and the processing shifts to the determination of the end of the loop processing for the HPF in FIG. 6. In step S37, the AF control circuit 1302 sets the direction judgment result for the currently selected evaluation value of the currently selected focus detection region to "far". The processing in FIG. 9 then ends, and the processing shifts to the determination of the end of the loop processing for the HPF in FIG. 6.

In step S38, the AF control circuit 1302 sets the direction judgment result for the currently selected evaluation value of the currently selected focus detection region to "indeterminate". The processing in FIG. 9 then ends, and the processing shifts to the determination of the end of the loop processing for the HPF in FIG. 6.

As above, in the present embodiment, because a two-step direction judgment is made by use of the evaluation values of the nearest three frames, the precision of the direction judgment can be increased. Although a direction judgment is made from evaluation values of three frames in the example shown in FIG. 9, a direction judgment may be made by use of the evaluation values of four or more frames. The number of evaluation values used in the af_val_dlt judgment processing can be suitably decided by the trade-off between the precision of the direction judgment and the processing time of AF.

Here, back to the explanation of FIG. 6, the AF control circuit 1302 performs the determination of the end of the loop processing for each of the HPFs after the direction judgment computation processing in step S11. That is, when it is determined that the processing in steps S11 is finished for the results of all the HPFs in the currently selected focus detection region, the loop processing for each of the HPFs ends. In this case, the processing shifts to step S12. In contrast, when it is determined that the processing in steps S11 is not finished for the results of all the HPFs in the currently selected focus detection region, the processing returns to step S11 after the switch of the HPFs.

In step S12, the AF control circuit 1302 performs direction judgment processing for the selected focus detection region. The processing then shifts to determination of the end of the loop processing for each of the focus detection regions. Overall direction judgment processing for the focus detection region is described. FIG. 10 is a flowchart showing direction judgment processing in the individual focus detection region. In step S41, the AF control circuit 1302 performs priority determination processing of the HPFs. The processing then shifts to the determination of the end of the loop processing for each of the focus detection regions.

The priority determination processing of the HPFs is performed, for example, in accordance with a table shown in FIG. 11. In FIG. 11, "O" indicates that the direction judgment is fixed by use of the result of the corresponding HPF. The "same" indicates that the direction judgment result is the same as the direction judgment results based on the results of the other HPFs.

In the example of FIG. 11, the AF control circuit 1302 first determines whether the direction judgment is fixed by use of the result of the HPF3. When the direction judgment is fixed by use of the result of the HPF3, the AF control circuit 1302 uses the direction judgment result by the HPF3.

When the direction judgment result by the HPF3 is not fixed, the AF control circuit 1302 determines whether the direction judgment result by the HPF2 is the same as the direction judgment result by the HPF1. When the direction judgment result by the HPF2 is the same as the direction judgment result by the HPF1, the AF control circuit 1302 uses the direction judgment result by the HPF2.

When the direction judgment result by the HPF2 is not the same as the direction judgment result by the HPF1, the AF control circuit 1302 determines whether the direction judgment is fixed by use of the result of the HPF2. When the direction judgment is fixed by use of the result of the HPF2, the AF control circuit 1302 uses the direction judgment result by the HPF2. When the direction judgment is not fixed by use of the result of the HPF2, the AF control circuit 1302 determines whether the direction judgment is fixed by use of the result of the HPF1. When the direction judgment is fixed by use of the result of the HPF1, the AF control circuit 1302 uses the direction judgment result by the HPF1.

Thus, in the example of FIG. 11, priority is set so that the direction judgment results based on the results of the HPFs higher in cut-off frequency are of higher importance. This is because the direction judgment results based on the results of the HPFs higher in cut-off frequency are more precise in the vicinity of focus where an obtained image includes more high-frequency components.

Here, back to the explanation of FIG. 6, the AF control circuit 1302 performs determination of the end of the loop processing for each of the focus detection regions after step S12. That is, when it is determined that the processing insteps S11 to S12 is finished for all the focus detection regions, the loop processing for each of the focus detection regions ends. In this case, the processing shifts to step S13. In contrast, when it is determined that the processing in steps S11 to S12 is not finished for all the focus detection regions, the processing returns to step S11 after the switch of the focus detection regions.

In step S13, the AF control circuit 1302 performs overall direction judgment processing for the focus detection region. Thus, the direction judgment processing ends. The processing then shifts to step S4 in FIG. 4. The overall direction judgment processing is described. FIG. 12 is a flowchart showing the overall direction judgment processing. In step S51, the AF control circuit 1302 performs priority determination processing of the focus detection regions. The processing in FIG. 12 then ends.

The priority determination processing of the focus detection regions is performed, for example, in accordance with a table shown in FIG. 13. In the table shown in FIG. 13, priority is set so that the results of "near" of the small regions closer to the center have priority. However, the direction judgment results regarding the small regions are considered only when all the following conditions are satisfied.

(1) Not tracking.
(2) Not detecting a face.
(3) Not conducting digital tele-conversion.
(4) Not conducting movie tele-conversion.
(5) Not acquiring the output of the gyro-sensor circuit 136.
(6) The current position of the focus lens is not located at a near position rather than the optically nearest position (which is only applied to the small regions for which the direction judgment results are "near").
(7) The subject is not a point light source.

In the example of FIG. 13, the AF control circuit 1302 first determines whether the direction judgment result regarding the small region (5) is "near". When the direction judgment result is "near", the AF control circuit 1302 decides that the overall direction judgment result is "near". When the direction judgment result regarding the small region (5) is not "near", the AF control circuit 1302 determines whether the direction judgment result regarding the small region (8) is "near". When the direction judgment result is "near", the AF control circuit 1302 decides that the overall direction judgment result is "near". When the direction judgment result regarding the small region (8) is not "near", the AF control circuit 1302 determines whether the direction judgment result regarding the small region (4) is "near". When the direction judgment result is "near", the AF control circuit 1302 decides that the overall direction judgment result is "near". Similarly, the AF control circuit 1302 determines whether the direction judgment results are "near" in the order of the small region (6), the small region (2), the small region (7), the small region (9), the small region (1), the small region (3), and the middle region. When the direction judgment results are "near", the AF control circuit 1302 decides that the overall direction judgment result is "near".

When the direction judgment result regarding the middle region is not "near", the AF control circuit 1302 determines whether the direction judgment result regarding the small region (5) is "far". When the direction judgment result is "far", the AF control circuit 1302 decides that the overall direction judgment result is"far". When the direction judgment result regarding the small region (5) is not "far", the AF control circuit 1302 determines whether the direction judgment result regarding the small region (8) is "far". When the direction judgment result is "far", the AF control circuit 1302 decides that the overall direction judgment result is "far". When the direction judgment result regarding the small region (8) is not "far", the AF control circuit 1302 determines whether the direction judgment result regarding the small region (4) is "far". When the direction judgment result is "far", the AF control circuit 1302 decides that the overall direction judgment result is "far". Similarly, the AF control circuit 1302 determines whether the direction judgment results are "far" in the order of the small region (6), the small region (2), the small region (7), the small region (9), the small region (1), the small region (3), and the middle region. When the direction judgment results are "far", the AF control circuit 1302 decides that the overall direction judgment result is "far".

When the direction judgment result regarding the middle region is not "far", the AF control circuit 1302 determines whether the direction judgment result regarding the large region is "near". When the direction judgment result is "near", the AF control circuit 1302 decides that the overall direction judgment result is "near". When the direction judgment result is not "near", the AF control circuit 1302 determines whether the direction judgment result regarding the large region is "far". When the direction judgment result is "far", the AF control circuit 1302 decides that the overall direction judgment result is "far". When the direction judgment result is not "far", the AF control circuit 1302 decides that the overall direction judgment result is "indeterminate".

Thus, in the example of FIG. 13, the small regions, the middle region, and the large region are set in descending order of priority. This is because the small regions can reduce the influence of the far-and-near mixing subject. The small regions closer to the center are of higher priority, and the priority is set higher on the lower side than on the upper side. One reason is that composition is often decided so that the subject of interest is located in the center and that the subject of interest is often present on the lower side of the image rather than on the upper side. Another reason is that the near subject is often present on the lower side of the image rather than on the upper side.

Next, the focus state update processing is described. In the moving image AF, there are changes that can affect focus adjustment such as an operation to move the imaging device 100 by the user, known as panning or tilting. Even if the imaging device 100 is not moving, there are changes in the subject state that can affect focus adjustment, such as a change in the contrast of the subject or the movement of the subject. In the focus state update processing, the current focus state is updated to one of the states in the state transition diagram of FIG. 14 from the change in the state of the imaging device 100 and the change in the subject state. In the example of FIG. 14, the focus state includes one of "panning", "motion vector", "normal", "far-and-near mixing", "unknown", and "vicinity of focus". "Panning" is a state where panning movement of the imaging device 100 (a user operation to move the imaging device 100 in a direction parallel to the surface of the earth at a substantially constant velocity) or tilting movement (a user operation to move the imaging device 100 in a direction vertical to the surface of the earth at a substantially constant velocity) is detected by the output of the gyro-sensor circuit 136. "Motion vector" is a state where the movement of the subject is detected from the change of the motion vector. "Normal" is a state where the subject is determined to be a normal subject which is not a far-and-near mixing subject. That is, "Normal" is a state where it is determined that subjects different in distance do not exist in one focus detection region. "Far-and-near mixing" is a state where the subject is determined to be a far-and-near mixing subject. That is, "Far-and-near mixing" is a state where it is determined that subjects different in distance exist in one focus detection region. "Unknown" is a state where it is not determined whether the subject is a far-and-near mixing subject or a normal subject. "Vicinity of focus" is a state where the position of the focus lens is determined to be in the vicinity of focus . As shown in FIG. 14, when the focus state is "panning" or "motion vector", the focus state maintains the original state or can make the transition to "unknown". When the focus state is "unknown", the focus state maintains the original state or can make the transition to "far-and-near mixing" or "normal". When the focus state is "far-and-near mixing", the focus state maintains the original state or can make the transition to "normal". When the focus state is "normal", the focus state maintains the original state or can make the transition to "vicinity of focus". When the changes of the evaluation values are great in all the focus states, the focus states can make the transition to "unknown".

Figures 16, 17:
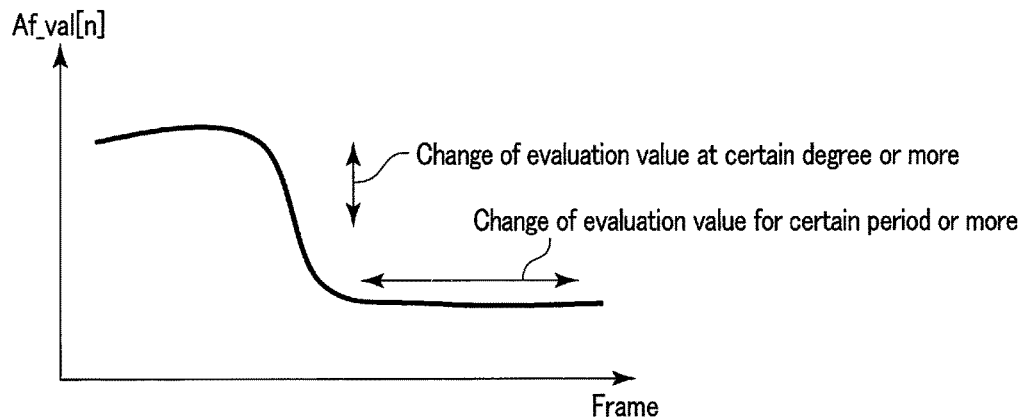
FIG. 16 is a graph illustrating contrast change detection processing.
FIG. 17 is a diagram showing a table that associates current focus states, the contents of determination, and transition destinations of focus states.

FIG. 15 is a flowchart showing the focus state update processing. In step S61, the AF control circuit 1302 performs gyro determination processing. The gyro determination processing is processing of the highest priority in the focus state update processing. In the gyro determination processing, the AF control circuit 1302 determines whether the imaging device 100 is making a panning movement or a tilting movement from the output of the gyro-sensor circuit 136. For example, when a movement at a substantially constant velocity in a panning direction (a direction parallel to the surface of the earth) is detected from the output of the gyro-sensor circuit 136 which detects a movement in the panning direction, it is determined that the imaging device 100 is making a panning movement. When a movement at a substantially constant velocity in a tilting direction (a direction vertical to the surface of the earth) is detected from the output of the gyro-sensor circuit 136 which detects a movement in the tilting direction, it is determined that the imaging device 100 is making a tilting movement. When it is determined that the imaging device 100 is making the panning movement or the tilting movement, the AF control circuit 1302 causes the focus state to make the transition to "panning". The processing in FIG. 17 then ends. When it is determined that the imaging device 100 is making neither the panning movement nor the tilting movement, the AF control circuit 1302 determines whether the current focus state is "panning". When it is determined that the current focus state is "panning", the AF control circuit 1302 causes the focus state to make the transition to "unknown". The processing in FIG. 15 then ends. When it is determined that the current focus state is not "panning", the processing shifts to step S62. In step S62, the AF control circuit 1302 performs contrast change detection processing. The contrast change detection processing is processing to detect the change of the evaluation value which does not depend on the step drive. Here, the change of the evaluation value of the large region is determined in the contrast change detection processing. In the contrast change detection processing, as shown in FIG. 16, it is determined whether the evaluation value Afval[n] which is a value indicating contrast continues to decrease a certain value or more for a certain period. When it is determined that the decrease equal to or more than the certain value of the evaluation value Afval [n] continues for the certain period, the AF control circuit 1302 causes the focus state to make the transition to "unknown". The processing in FIG. 15 then ends. When it is determined that the evaluation value Afval[n] does not decrease a certain value or more or the decrease of the evaluation value Afval[n] does not continue for the certain period, the processing shifts to step S63. The decrease of the evaluation value Afval [n] is only used for determination so that it will not be determined that the evaluation value Afval[n] changes due to the increase of the evaluation value Afval[n] resulting from the driving of the focus lens.

In step S63, the AF control circuit 1302 performs motion vector determination processing. In the motion vector determination processing, the AF control circuit 1302 determines whether a motion vector more than a certain magnitude is detected from more than one frame of image data. When it is determined that a motion vector more than the certain magnitude is detected, the AF control circuit 1302 causes the focus state to make the transition to "motion vector". The processing in FIG. 15 then ends. When it is determined that a motion vector more than the certain magnitude is not detected, the processing shifts to step S64.

In step S64, the AF control circuit 1302 performs matrix determination processing. In the matrix determination processing, different determinations are made depending on the current focus state. The focus state is updated in accordance with the result of this determination. FIG. 17 is a diagram showing a table that associates a current focus states, the contents of determination, and transition destinations of the focus states. In the example of FIG. 17, when the current focus state is "normal", focus vicinity determination processing is performed. In the focus vicinity determination processing, the focus state can make the transition to "focus vicinity". When the current focus state is "far-and-near mixing", normal subject determination processing is performed. In the normal subject determination processing, the focus state can make the transition to "normal". When the current focus state is "unknown", far-and-near mixture determination processing is performed. In the far-and-near mixture determination processing, the focus state can make the transition to "far-and-near mixing" or "normal".

The focus vicinity determination processing is described. The focus vicinity determination processing is processing to determine whether the focus lens is close to the focus position from the history of the drive direction in the step phase and the change of the evaluation value. In the focus vicinity determination processing, whether all the following four conditions are satisfied is determined.

(1) A certain number of step drives or more in the same drive direction are performed.

(2) The change of the evaluation value from the direction judgment reference value of the target focus detection region is equal to or more than a threshold.

(3) The current result of the HPF1 of the target focus detection region is equal to or more than a threshold.

(4) The result of the HPF3 is used as the direction judgment result of the target focus detection region.

Figure 18:
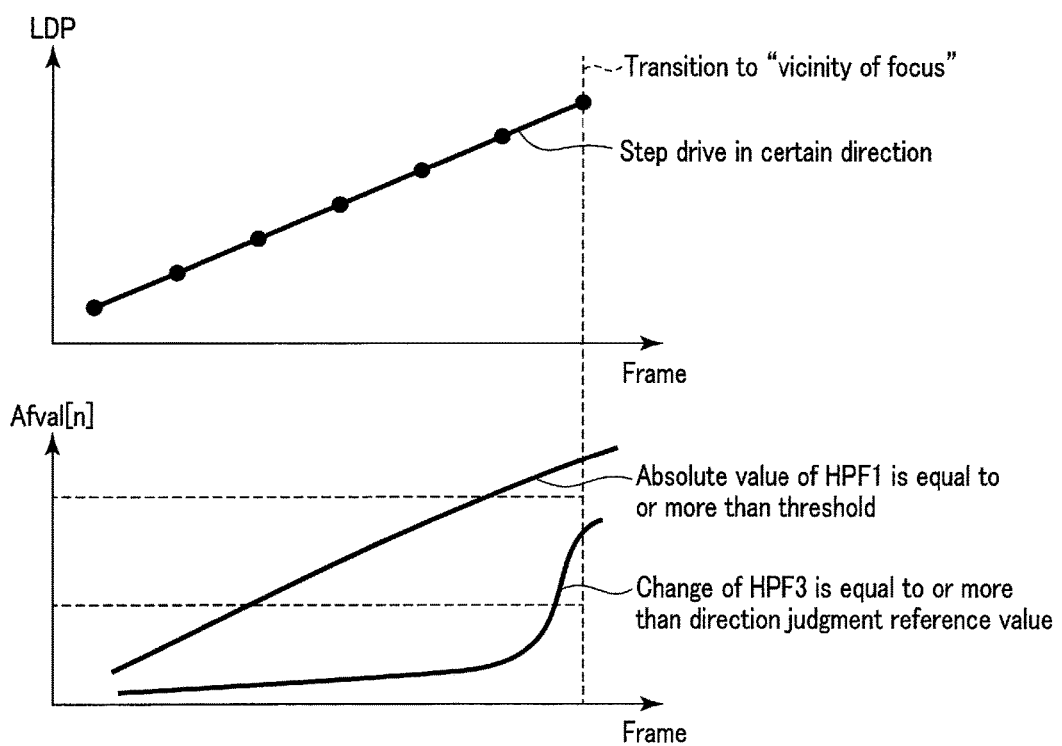
FIG. 18 is a graph illustrating focus vicinity determination processing.

In the focus vicinity determination processing, the AF control circuit 1302 causes the focus state to make the transition to "focus vicinity" when it is determined that all the conditions (1) to (4) are satisfied. The processing in FIG. 15 then ends. FIG. 18 shows an example of the lens position and the state of the evaluation value when the conditions (1) to (4) are satisfied. The horizontal axes in the graphs of FIG. 18 indicate the frame number. The vertical axis in the upper graph of FIG. 18 indicates a lens position LDP, and the vertical axis in the lower graph indicates the evaluation value Afval[n] .

In the focus vicinity determination processing, the AF control circuit 1302 leaves the focus state "normal" when determining that all the conditions (1) to (4) are not satisfied. The processing in FIG. 15 then ends.

The normal subject determination processing is described. The normal subject determination processing is processing to determine whether the subject is a normal subject or a far-and-near mixing subject. In the normal subject determination processing, it is determined that the subject is a normal subject when the frames in which the direction judgment results of the middle region and the small regions are the same come in succession.

As specific processing, whenever performing the normal subject determination processing, the AF control circuit 1302 determines whether the overall direction judgment result of the current focus detection region is the same as the direction judgment result of the middle region. As obvious from FIG. 13, the direction judgment results of the small regions are considered more important than the direction judgment result of the middle region in the direction judgment processing. Therefore, if the overall direction judgment result of the current focus detection region is the same as the direction judgment result of the middle region, it can be considered that the direction judgment results of the middle region and the small regions are the same.

When it is determined that the overall direction judgment result of the current focus detection region is the same as the direction judgment result of the middle region, the AF control circuit 1302 counts up a count value general_sbj_cnt. The count value general_sbj_cnt is a count value that indicates the number of successive frames in which the direction judgment results of the middle region and the small regions are the same. The count value general_sbj_cnt is updated, for example, at the start of the step phase or at the time of the update of the focus state. After counting up the count value general_sbj_cnt, the AF control circuit 1302 determines whether the count value general_sbj_cnt is equal to or more than a threshold. When determining that the count value general_sbj_cnt is equal to or more than the threshold, the AF control circuit 1302 causes the focus state to make the transition to "normal". When the AF control circuit 1302 does not count up the count value general_sbj_cnt or when the AF control circuit 1302 determines that the count value general_sbj_cnt is less than the threshold, the AF control circuit 1302 leaves the focus state "far-and-near mixing". The processing in FIG. 15 then ends.

The far-and-near mixture determination processing is described. The far-and-near mixture determination processing is processing to determine whether the subject is a normal subject or a far-and-near mixing subject when the focus state is "unknown". FIG. 19 is a flowchart showing the far-and-near mixture determination processing. In step S71, the AF control circuit 1302 determines whether to perform the far-and-near mixture determination processing. When all the following conditions are satisfied, it is determined that the far-and-near mixture determination processing is to be performed.

(1) An image magnification variation resulting from the driving of the focus lens is not great.
(2) The diaphragm 106 is not stopped down.
(3) The depth of field is not great.
(4) An image plane distance from the infinity end to the nearest end of the focus lens is not long as compared with a unit-defocus image-plane movement amount (an amount of movement of an image on the image plane when the focus lens moves a unit distance).

When it is determined in step S71 that the far-and-near mixture determination processing is not to be performed, the processing shifts to step S72. When it is determined in step S71 that the far-and-near mixture determination processing is to be performed, the processing shifts to step S75.

In step S72, the AF control circuit 1302 determines whether to determine that the subject is determined to be a normal subject. In step S72, it is determined that the subject is determined to be a normal subject when the number of times of switch drive has become greater than a threshold and the performance of the direction judgment deteriorates. In step S72, it is determined that the subject is determined to be a normal subject when the state of the search phase that will be described later is "normal subject determination". When it is determined in step S82 that the subject is determined to be a normal subject, the processing shifts to step S73. When it is determined in step S72 that the subject is not determined to be a normal subject, the processing shifts to step S74.

In step S73, the AF control circuit 1302 causes the focus state to make the transition to "normal". The processing in FIG. 19 then ends. In this instance, the processing in FIG. 15 also ends. In step S74, the AF control circuit 1302 causes the focus state to make the transition to "unknown". The processing in FIG. 19 then ends. In this instance, the processing in FIG. 15 also ends.

Figure 20:
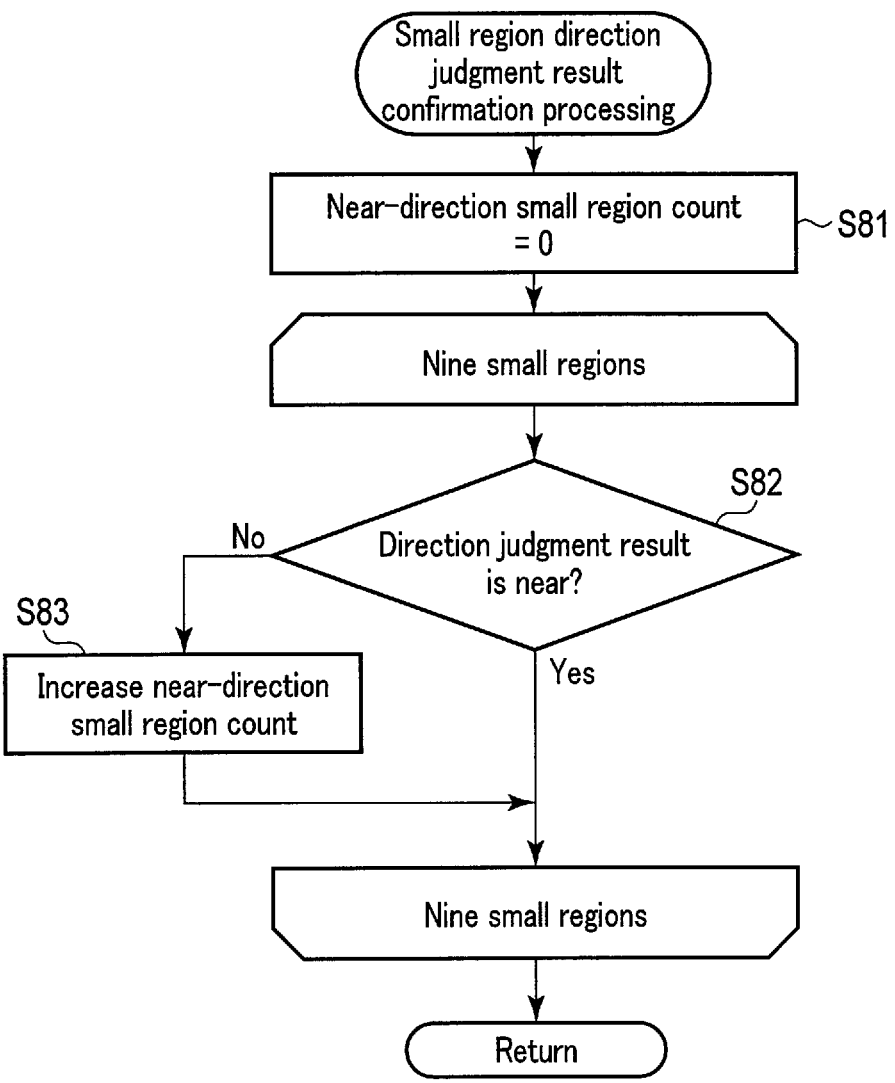
FIG. 20 is a flowchart showing small region direction judgment result confirmation processing.

In step S75, the AF control circuit 1302 performs small region direction judgment result confirmation processing. FIG. 20 is a flowchart showing the small region direction judgment result confirmation processing. In step S81, the AF control circuit 1302 initializes a near-direction small region count to 0. The near-direction small region count is a count value which indicates the number of small regions in which the direction judgment results are "near".

The AF control circuit 1302 then selects the small regions for which the loop processing is to be performed, for example, from the upper right small region to the lower left small region. The small regions may be selected in different orders.

In step S82, the AF control circuit 1302 determines whether the currently selected direction judgment result is "near". When it is determined in step S82 that the direction judgment result is "near", the processing shifts to step S83. When it is determined in step S82 that the direction judgment result is not "near", the processing shifts to determination of the end of the loop processing for the small regions.

In step S83, the AF control circuit 1302 increases the near-direction small region count by one. The processing then shifts to determination of the end of the loop processing for the small regions.

After step S82 or S83, the AF control circuit 1302 performs determination of the end of the loop processing for each of the small regions. That is, when it is determined that the processing in steps S82 to S83 is finished for all the small regions, the loop processing for each of the small regions ends. The processing in FIG. 20 then ends.

Here, back to the explanation of FIG. 19, the AF control circuit 1302 determines instep S76 whether the current subject is in the far-and-near mixing state. For example, when the value of the near-direction small region count is higher than a threshold (e.g. the majority), it is determined that the current subject is in the far-and-near mixing state. If there are a large number of small regions in which the direction judgment results are "near", it can be considered that more than one subject are mixed when seen in the middle region or the large region. When it is determined in step S76 that the current subject is not in the far-and-near mixing state, the processing shifts to step S77. When it is determined in step S76 that the current subject is in the far-and-near mixing state, the processing shifts to step S78.

In step S77, the AF control circuit 1302 causes the focus state to make the transition to "normal". The processing in FIG. 19 then ends. In this instance, the processing in FIG. 15 also ends. In step S78, the AF control circuit 1302 causes the focus state to make the transition to "far-and-near mixing". The processing in FIG. 19 then ends. In this instance, the processing in FIG. 15 also ends.

Next, the lens drive processing is described. FIG. 21 is a flowchart showing lens drive instruction processing. In step S91, the AF control circuit 1302 performs processing to select a step factor by the focus state. In the step factor selection processing, a step factor to decide a step amount at the time of lens driving is selected by the focus state. FIG. 22 is a diagram showing a table that shows the correspondence between the focus states and the step factors. As shown in FIG. 22, the step factor is represented as a defocus amount and an image magnification variation amount. The defocus amount and the image magnification variation amount are amounts related to the appearance of a live-view at the time of lens driving. Therefore, it is possible to achieve both tracking performance of AF and the appearance of the live-view by deciding the step amount on the basis of the defocus amount or the image magnification variation amount.

In FIG. 22, the defocus amount in the case where the focus state is "normal" can be set to values ranging from 1Fδ to 4Fδ (F: F number, δ: the diameter of a permissible circle of confusion) which are values higher than in other focus states. The image magnification variation amount in the case where the focus state is "normal" is set to a value higher than in other focus states. When the focus state is "normal", there is a possibility that the image may not be in the vicinity of focus and may be blurred, so that the appearance of the live-view does not deteriorate even if the step amount is increased to some degree. Therefore, the defocus amount and the image magnification variation amount that are selected are set to values higher than the amounts in other focus states. This improves the tracking performance of AF.

Meanwhile, when the focus state is "focus vicinity", "panning", and "far-and-near mixing", smaller step amounts are set because focus precision is considered important. When the focus state is "unknown", the lens is driven with a fixed step amount.

In step S92, the AF control circuit 1302 performs step amount calculation processing. The defocus amount and the image magnification variation amount that are selected in step S91 are respectively converted into step amounts in the step amount calculation processing. The step amounts are represented as, for example, the number of pulses with which the focus adjustment mechanism 104 drives the focus lens. The step amounts are calculated, for example, on the basis of a conversion formula to find a step amount from a defocus amount and a conversion formula to find a step amount from the image magnification variation amount prestored in the AF control circuit 1302. After calculating the step amounts, the AF control circuit 1302 uses a smaller one of the two step amounts as a final step amount.

In step S93, the AF control circuit 1302 performs maximum value clipping processing. The step amount is calculated as a multiplication of a parameter such as the defocus amount prestored in the AF control circuit 1302 by the step factor. Thus, there is a possibility that a step amount to be calculated may be greater than a maximum step amount that can be set in the focus adjustment mechanism 104. Therefore, in the maximum value clipping processing, when a calculated step amount is greater than the maximum value that can be set in the focus adjustment mechanism 104, the calculated step amount is clipped at the maximum value.

Figure 23:
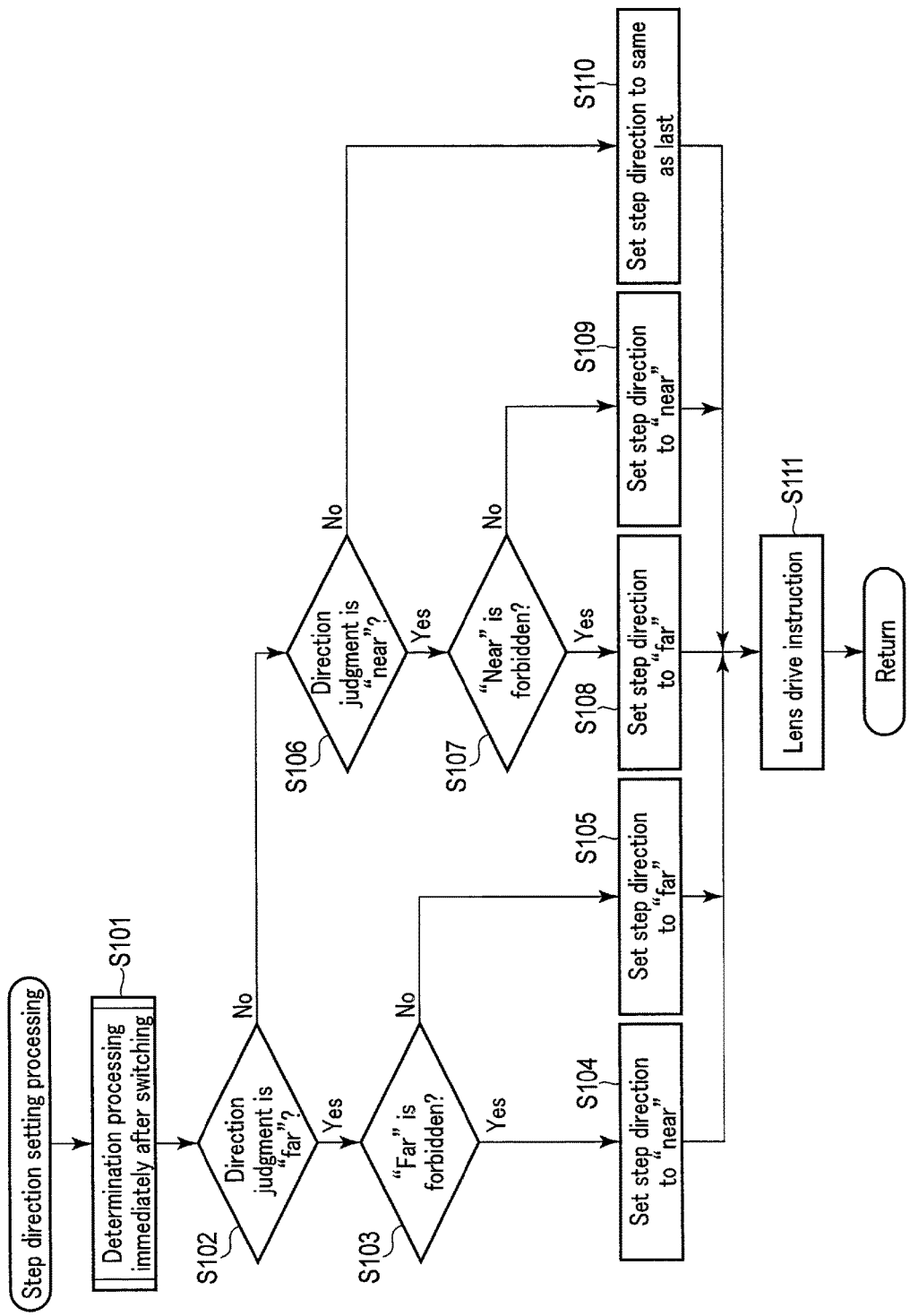
FIG. 23 is a flowchart showing step direction setting processing.

In step S94, the AF control circuit 1302 performs step direction setting processing. The processing in FIG. 21 then ends. The step direction setting processing is described. FIG. 23 is a flowchart showing the step direction setting processing. In step S101, the AF control circuit 1302 performs determination processing immediately after switching. After the determination processing immediately after switching, the processing shifts to step S102. FIG. 24 is a flowchart showing the determination processing immediately after switching. In step S121, the AF control circuit 1302 determines whether the step direction is switched from "far" to "near", from the results of the preceding two times of step direction setting processing. When it is determined in step S121 that the step direction before last is "far" and that the last step direction is "near", it is determined that the step direction is switched from "far" to "near". When it is determined in step S121 that the step direction is switched from "far" to "near", the processing shifts to step S122. When it is determined in step S121 that the step direction is not switched from "far" to "near", the processing shifts to step S123.

In step S122, the AF control circuit 1302 sets to forbid the step drive to "far". For example, the AF control circuit 1302 sets a flag to forbid the step drive to "far". The processing in FIG. 24 then ends.

In step S123, the AF control circuit 1302 determines whether the step direction is switched from "near" to "far", from the results of the preceding two times of step direction setting processing. When it is determined in step S123 that the step direction before last is "near" and that the last step direction is "far", it is determined that the step direction is switched from "near" to "far". When it is determined in step S123 that the step direction is switched from "near" to "far", the processing shifts to step S124. When it is determined in step S123 that the step direction is not switched from "near" to "far", the processing shifts to step S125.

In step S124, the AF control circuit 1302 sets to forbid the step drive to "near". For example, the AF control circuit 1302 sets a flag to forbid the step drive to "near". The processing in FIG. 24 then ends.

In step S125, the AF control circuit 1302 cancels the forbiddance of the step drive. The processing in FIG. 24 then ends.

Here, returning to the explanation of FIG. 23, the AF control circuit 1302 determines in step S102 whether the direction judgment result of the whole focus detection region is "far". When it is determined in step S102 that the direction judgment result is "far", the processing shifts to step S103. When it is determined in step S102 that the direction judgment result is not "far", the processing shifts to step S106.

In step S103, the AF control circuit 1302 determines, for example, by referring to a flag, whether the step drive to "far" is forbidden. When it is determined in step S103 that the step drive to "far" is forbidden, the processing shifts to step S104. When it is determined in step S103 that the step drive to "far" is not forbidden, the processing shifts to step S105.

In step S104, the AF control circuit 1302 sets the step direction to "near". The processing then shifts to step S111. That is, when the switch drive from "far" to "near" is performed in the last step drive (when the step drive direction before last is "far" and the last step drive direction is "near"), the step direction is set to "near" so that, in the following current step drive, the switch drive may not be performed even if the direction judgment is "far".

In step S105, the AF control circuit 1302 sets the step direction to "far". The processing then shifts to step S111. That is, when the switch drive from "far" to "near" is not performed in the last step drive (when the step drive direction before last is not "far" and the last step drive direction is not "near"), the step direction is set to "far" in accordance with the current direction judgment result.

In step S106, the AF control circuit 1302 determines whether the current direction judgment result of the whole focus detection region is "near". When it is determined in step S106 that the direction judgment result is "near", the processing shifts to step S107. When it is determined in step S106 that the current direction judgment result is not "near", the processing shifts to step S110.

In step S107, the AF control circuit 1302 determines, for example, by referring to a flag, whether the step drive to "near" is forbidden. When it is determined in step S107 that the step drive to "near" is forbidden, the processing shifts to step S108. When it is determined in step S107 that the step drive to "near" is not forbidden, the processing shifts to step S109.

In step S108, the AF control circuit 1302 sets the step direction to "far". The processing then shifts to step S111. That is, when the switch drive from "near" to "far" is performed in the last step drive (when the step drive direction before last is "near" and the last step drive direction is "far"), the step direction is set to "far" so that, in the following current step drive, the switch drive may not be performed even if the direction judgment is "near".

In step S109, the AF control circuit 1302 sets the step direction to "near". The processing then shifts to step S111. That is, when the switch drive from "near" to "far" is not performed in the last step drive (when the step drive direction before last is not "near" and the last step drive direction is not "far"), the step direction is set to "near" in accordance with the current direction judgment result.

In step S110, the AF control circuit 1302 sets the step direction to the same direction as that set in the last step direction setting processing. The processing then shifts to step S111. The processing instep S110 is processing in the case where the direction judgment result of the whole focus detection region is "indeterminate".

In step S111, the AF control circuit 1302 instructs the focus adjustment mechanism 104 to drive the focus lens, including the step amount and the step direction. The processing in FIG. 23 then ends. The focus adjustment mechanism 104 drives the focus lens in response to the instruction from the AF control circuit 1302.

Next, the focus judgment processing is described. FIG. 25 is a flowchart showing the focus judgment processing. In step S131, the AF control circuit 1302 performs switched focus judgment processing. After the switched focus judgment processing, the processing shifts to step S132. FIG. 26 is a flowchart showing the switched focus judgment processing. In step S141, the AF control circuit 1302 determines, from the history of the step drive, whether the track of the step drive is a switched track. In step S141, it is determined whether a predetermined number of times of (e.g. three) switch drives to determine the peak of an evaluation value have been performed. When the predetermined number of times of switch drives have been performed, it is determined that the track of the step drive is the switched track. When the track of the step drive is the switched track in step S141, the processing shifts to step S142. When the track of the step drive is not the switched track in step S141, the processing shifts to step S146.

In step S142, the AF control circuit 1302 determines whether disturbance determination is OK. In step S142, it is determined, from the history of the step drive, whether the switch drive has been performed in a state where there is no disturbance. For example, when the switch drive is performed in a state where the output of the gyro-sensor circuit 136 is not unstable, the motion vector is not unstable, and the zoom, the diaphragm, and the like are not changing, it is determined that the disturbance determination is OK. When the disturbance determination is OK in step S142, the processing shifts to step S143. When the disturbance determination is not OK in step S142, the processing shifts to step S146. That is, when there is disturbance, there is a possibility of false focus, so that the calculation of a focus position will not be performed.

In step S143, the AF control circuit 1302 determines whether the direction judgment result obtained in the direction judgment processing is OK. In step S143, it is determined that the direction judgment processing is OK when the direction judgment result is obtained with sufficient degrees of the absolute values and difference of evaluation values. When it is determined in step S143 that the direction judgment result obtained in the direction judgment processing is OK, the processing shifts to step S144. When it is determined in step S143 that the direction judgment result obtained in the direction judgment processing is not OK, the processing shifts to step S146.

In step S144, the AF control circuit 1302 determines that the focus judgment is positive. In step S145, the AF control circuit 1302 calculates a focus position. The focus position is the middle position of the amplitude of the switch drive. The processing in FIG. 26 then ends.

In step S146, the AF control circuit 1302 determines that the focus judgment is not positive. The processing in FIG. 26 then ends.

Figure 27:
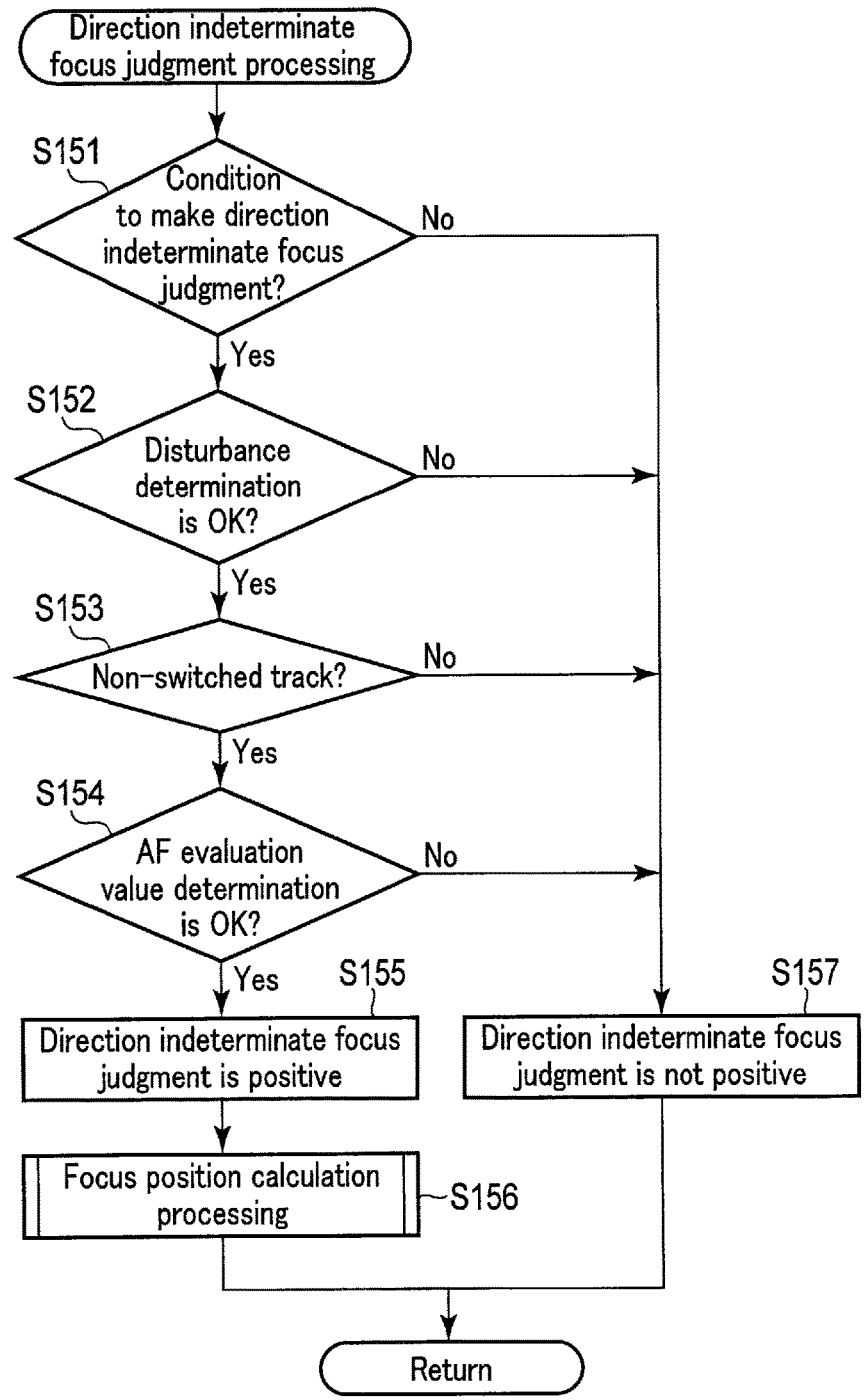
FIG. 27 is a flowchart showing direction indeterminate focus judgment processing.

Here, returning to the explanation of FIG. 25, the AF control circuit 1302 performs direction indeterminate focus judgment processing in step S132. After the direction indeterminate focus judgment processing, the processing in FIG. 25 then ends. FIG. 27 is a flowchart showing the direction indeterminate focus judgment processing. In step S151, the AF control circuit 1302 determines whether implementation conditions of the direction indeterminate focus judgment processing are satisfied. In step S151, it is determined whether one of the following four conditions is satisfied. When it is determined that one of the following four conditions is satisfied, the processing shifts to step S152. When it is determined that none of the following four conditions is satisfied, the processing shifts to step S157.

(1) An image magnification variation per 1Fδ as an open reference value is equal to or more than a predetermined value (e.g. 0.049%), and the focal distance is less than or equal to a predetermined value (e.g. 35 mm) (because the direction judgment becomes difficult if the image magnification variation increases)

(2) The current aperture value is higher than a predetermined value (e.g. F10) (because the direction judgment becomes difficult if the diaphragm 106 is stopped down)

(3) When the current aperture value is higher than a predetermined value (e.g. F8), and an LD stroke (a lens drive amount necessary for focus adjustment. A result of dividing the number of pulses from the near end to the far end by the number of pulses corresponding to 1Fδ (focal depth)) is less than a predetermined value (e.g. 110) (because it is difficult to form a state of significant blur even with a certain degree of lens drive error, owing to a certain degree of depth of field and a short LD stroke)

(4) When the depth of field is less than or equal to a predetermined value (1 m) (because a certain degree of lens drive error is permitted when the depth of field is great)

In step S152, the AF control circuit 1302 determines whether the disturbance determination is OK. In step S152, it is determined, from the history of the step drive, whether the individual switch drive has been performed in a state where there is no disturbance. For example, in a state where the output of the gyro-sensor circuit 136 is not unstable, the motion vector is not unstable, and the zoom, the diaphragm, and the like are not changing, it is determined that the disturbance determination is OK. When the disturbance determination is OK in step S152, the processing shifts to step S153. When the disturbance determination is not OK in step S152, the processing shifts to step S157. That is, when there is disturbance, there is a possibility of false focus, so that the calculation of a focus position will not be performed.

In step S153, the AF control circuit 1302 determines, from the history of the step drive, whether the track of the step drive is a non-switched track. In step S153, it is determined that the switch drive has been performed for a certain period.

In step S153, it is determined that the track of the step drive is the non-switched track when the following condition (1) is satisfied and the following condition (2) or (3) is satisfied. In step S153, when the track of the step drive is the non-switched track, the processing shifts to step S154. In step S153, when the track of the step drive is not the non-switched track, the processing shifts to step S157.

(1) The direction judgment result is "indeterminate".
(2) The focus state is "focus vicinity".
(3) The number of times of step drives in the same direction after the switch drive is more than two.

In step S154, the AF control circuit 1302 determines whether the evaluation value is OK. In step S154, it is determined that the evaluation value is OK when the following condition (1) is satisfied, the following condition (2) or (3) is satisfied, and the following condition (4) is satisfied. That is, it can be considered that the focus position is still ahead while the evaluation value is increasing even if the direction judgment result is "indeterminate". Therefore, the focus judgment is not determined until the evaluation value decreases. When the evaluation value is OK in step S154, the processing shifts to step S155. When the evaluation value is not OK in step S154, the processing shifts to step S157.

(1) Afval[n] is less than or equal to Afval[n−1]
(2) Afval[n] is less than or equal to a threshold
(3) Afval[n−1] is less than or equal to a threshold
(4) Afval[n] in one of the nine small regions is less than or equal to a threshold In step S155, the AF control circuit 1302 determines that the focus judgment is positive. Further, in step S156, the AF control circuit 1302 calculates a focus position. The focus position is the current position of the focus lens. After the calculation of the focus position, the processing in FIG. 27 ends.

In step S157, the AF control circuit 1302 determines that the focus judgment is not positive. The processing in FIG. 27 then ends.

FIG. 28A and FIG. 28B are diagrams to further illustrate the focus judgment processing. Here, FIG. 28A shows a contrast curve in the case where the switched focus judgment processing is applied, and FIG. 28B shows a contrast curve in the case where the direction indeterminate focus judgment processing is applied. That is, the changes of the evaluation value before and after the step drive are great in the example shown in FIG. 28A, whereas the changes of the evaluation value before and after the step drive are small in the example shown in FIG. 28B.

In the example shown in FIG. 28A, the evaluation value keeps increasing at first, so that the step drive in the same direction is continued. Further, after 8 steps of step drives, the position of the focus lens goes beyond the peak position of the evaluation value, and the direction judgment in a reverse direction is determined. Here, the position is beyond the peak position on the seventh step in the diagram, but the direction judgment result is "indeterminate" because the difference of evaluation values is small, and as a result, the step drive is performed in the same direction as the last step drive. During a series of step drives above, a predetermined number of times of (e.g. three) switches have not been made, so that the focus judgment is not positive.

Due to the first switch drive, the evaluation value changes from decrease to increase. Further, after 4 steps of step drives, the position of the focus lens again goes beyond the peak position of the evaluation value, and the direction judgment in the reverse direction is determined. During a series of these switch drives as well, a predetermined number of times of (e.g. three) switches have not been made yet, so that the focus judgment is not positive.

Due to the second switch drive, the evaluation value again changes from decrease to increase. After 4 steps of step drives, the position of the focus lens again goes beyond the peak position of the evaluation value, and the direction judgment in the reverse direction is determined. During a series of these switch drives as well, a predetermined number of times of (e.g. three) switches have not been made yet, so that the focus judgment is not positive.

The focus judgment is positive in the focus judgment processing after the third switch drive. In this instance, the focus position to be calculated is the position located two steps from the start position of the switch drive, which is the middle position of the amplitude of the switch drive.

On the other hand, in the example of FIG. 28B, the changes of the evaluation value before and after the step drive are small, but the evaluation value keeps increasing as long as the focus lens is proceeding to the focus position. Further, the evaluation value changes from increase to decrease when the focus lens has gone beyond the peak position. In this instance, the evaluation value becomes OK, and the focus judgment becomes positive. In the case where the contrast of the subject is low or the like, the difference of evaluation values may not be sufficiently great in some cases. However, the absolute value of the evaluation value increases as long as the focus lens is approaching the focus position. Moreover, when the position of the focus lens is located in the vicinity of the focus, the change of the evaluation value is especially small. Therefore, in the indeterminate direction focus judgment processing, the focus lens is stopped basically when the direction judgment can no longer be made, that is, when the direction judgment result is "indeterminate" and when the absolute value of the evaluation value is equal to or more than a threshold. However, there is actually a possibility that the evaluation value may keep increasing even if the direction judgment result is "indeterminate", so that the focus lens is stopped when the evaluation value has decreased. In this case, the focus lens is not stopped at the true focus position, which, however, does not make much difference in the direction indeterminate focus judgment processing.

As described above, in the present embodiment, AF is performed with the combination of slight driving of the focus lens in the first direction and slight driving of the focus lens in the second direction. In this instance, immediately after the switch drive from the first direction to the second direction is performed, driving in the first direction is forbidden, and then driving in the second direction is performed, even if the direction judged in the following direction judgment processing is the first direction. Consequently, even if the backlash amount is not known and even when the lens drive amount at the time of switching is smaller than the backlash amount, the influence of the backlash is reduced by the following lens drive in the same direction, so that the subsequent deterioration of AF performance can be inhibited.

This effect is further described below with reference to FIG. 29A, FIG. 29B, and FIG. 29C. FIG. 29A to FIG. 29C are diagrams conceptually showing the backlash, and the mechanism is different from the actual mechanism. The backlash in the drive mechanism of the focus lens is, for example, a clearance between a gear of a lens motor to drive the focus lens (a gear coupled to the lens motor) and a gear of the ball of the focus lens (a gear integrally fixed to the ball of the lens). Due to the mechanical presence of such backlash, there occurs a state where the focus lens does not move even if the lens motor is rotated when the focus lens is driven in its optical axis direction. Here, as shown in FIG. 29A, in a state where the backlash on a lens drive direction side is eliminated, the rotation of the lens motor is transmitted to the balls of all the lenses, so that even when the lens drive amount is less than or equal to the backlash, the focus lens moves as much as the rotation amount of the lens motor.

On the other hand, when the switch drive is performed from the state in FIG. 29A, the backlash is not eliminated, and not all the rotation of the lens motor is transmitted to the balls of the lens. In particular, when the lens drive amount is less than or equal to the backlash, the backlash is not completely eliminated as in FIG. 29B, so that the focus lens does not move. In this case, the evaluation value which should ordinarily increase due to the switch drive does not increase. Therefore, errors occur in the following direction judgment results, leading to deterioration of AF performance.

In contrast, in the present embodiment, the step drive in the same direction is performed immediately after switching. As has been shown in FIG. 29B, the backlash is eliminated as much as the lens is driven even if the lens drive amount is less than or equal to the backlash. Therefore, as shown in FIG. 29C, the backlash is completely eliminated by more than one drive (e.g. two drives) in the same direction, so that the focus lens can be driven to a desired position. Thus, AF performance will be maintained thereafter as well.

Here, performing step drive in the same direction immediately after switch drive in the present embodiment is based on the idea that the switch drive performed immediately after the switch drive as in FIG. 30 is ordinarily impossible (the evaluation value should ordinarily increase due to the switch drive, and therefore, the direction judgment is not switched immediately thereafter), in the hill-climbing-type contrast AF in the present embodiment. On the other hand, when there is disturbance such as a change in the status of the imaging device or the subject immediately after the switch drive, the direction judgment can be switched. However, it is possible to remove the influence of such disturbance by forbidding the repeated switch drive immediately after the switch drive.

Furthermore, in the present embodiment, the direction indeterminate focus judgment processing is performed in the focus judgment processing. Basically, in the present embodiment, the backlash is eliminated by the repeated lens drive in the same direction immediately after the switching, so that desired lens drive is performed. However, for example, there can be a case where the backlash is not completely eliminated even if the repeated lens drive in the same direction is performed. Even in such a case, the focus lens can be driven to the focus position with a certain degree of accuracy by the direction indeterminate focus judgment processing.

The embodiment described above is based on the assumption that the switch drive is performed in a slight lens drive amount less than or equal to the backlash. Here, the aforementioned forbiddance of the switch drive is a measure against the impossibility of desired lens drive due to the backlash. If a step amount is greater than a predetermined value, there is a possibility that the backlash can be eliminated by one switch drive, in which case the switch drive may be unforbidden. For example, in the determinations in step S103 and step S107, it may be determined that the switch drive will be forbidden only when the switch drive is forbidden by a flag and the step amount is less than a predetermined value (e.g. a drive amount corresponding to the focal depth (1F$\delta$)).

Furthermore, in the aforementioned determination processing immediately after switching, whether it is immediately after switch drive is determined from the results of the last and second last step direction setting processing. In contrast, whether it is immediately after switch drive may be further determined from the results of the third last and second last step direction setting processing, and when the switch drive is performed in the last step drive or the step drive before last, it may be determined that it is immediately after switching. In this case, driving in the same direction is performed twice after the switch drive. Consequently, even if the lens drive amount becomes smaller, desired lens drive can be performed. When it is once determined that it is immediately after switch drive, driving in the same direction may be performed during the subsequent several frames. Alternatively, when it is determined that it is immediately after switch drive, driving in the same direction may be performed for a predetermined time corresponding to a predetermined number of frames. This also makes it possible to more certainly perform desired lens drive when the lens drive amount becomes smaller.

Each of the processes according to the embodiment described above can also be stored as a program that can be executed by a CPU or the like as a computer. This can also be stored and distributed in a storage medium of an external storage device such as a memory card, a magnetic disk, an optical disk, or a semiconductor memory. The CPU or the like then reads the program stored in the storage medium of the external storage device, and can perform the processing described above when the operation is controlled by the read program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A focus adjustment device which includes an imager to receive a light flux passing through an imaging lens including a focus lens and then generate an image signal and which performs focus adjustment on the basis of the image signal, the focus adjustment device comprising:

a direction judgment unit which calculates an evaluation value based on an image signal of a focus detection region set in a region of the imager where the light flux is received, thereby judging a drive direction of the focus lens to be in focus based on a difference of an evaluation value of a different position of the focus lens; and a control unit which controls a focus adjustment operation on the basis of the drive direction judged by the direction judgment unit, wherein the control unit causes the direction judgment unit to repeatedly judge the drive direction, and after the focus lens is slightly driven in a first direction judged on the basis of a first evaluation value and then the focus lens is slightly driven in a second direction different from the first direction on the basis of a subsequently calculated second evaluation value, when a drive amount of the focus lens in the second direction which is calculated based on the second evaluation value does not exceed a predetermined drive amount, the control unit forbids the slight driving of the focus lens in the first direction even though a drive direction judged on the basis of a further subsequently calculated third evaluation value is the first direction and the slight driving of the focus lens in the second direction is continuously performed, wherein the control unit does not forbid the slight driving of the focus lens in the first direction, when a drive amount of the focus lens in the second direction which is calculated based on the second evaluation value exceeds the predetermined drive amount, and causes the direction judgment unit to repeatedly judge the drive direction by slightly driving the focus lens in the first direction, and wherein the control unit determines that the focus lens is in focus when a sum of a number of times when the drive direction of the slight driving of the focus lens is changed from the first direction to the second direction and a number of the times when the drive direction is changed from the second direction to the first direction becomes a predetermined value.

2. The focus adjustment device according to claim 1, wherein the control unit forbids the slight driving of the focus lens in the first direction for a predetermined time.

3. The focus adjustment device according to claim 1, wherein the predetermined value is a drive amount of the focus lens corresponding to the focal depth of the imaging lens.

4. The focus adjustment device according to claim 1, wherein the control unit determines that the focus lens is in focus when the direction judgment by the direction judgment unit is not determined and when the first evaluation value calculated after the focus lens is kept slightly driven in the first direction is equal to or more than a predetermined value.

5. The focus adjustment device according to claim 1, wherein after the control unit determines that the focus lens is in focus, the control unit moves the focus lens to a location between the position of the focus lens when the direction is changed from the first direction to the second direction and the position of the focus lens when the direction is changed from the second direction to the first direction.

6. A focus adjustment method to perform focus adjustment on the basis of an image signal from an imager which receives a light flux passing through an imaging lens including a focus lens and then generates the image signal, the focus adjustment method comprising:
calculating an evaluation value based on an image signal of a focus detection region set in a region of the imager where the light flux is received, thereby judging a drive direction of the focus lens to be in focus based on a difference of an evaluation value of a different position of the focus lens; and
controlling a focus adjustment operation on the basis of the judged drive direction,
wherein the drive direction is repeatedly judged, and after the focus lens is slightly driven in a first direction judged on the basis of a first evaluation value and then the focus lens is slightly driven in a second direction different from the first direction on the basis of a subsequently calculated second evaluation value, when a drive amount of the focus lens in the second direction which is calculated based on the second evaluation value does not exceed a predetermined drive amount, the slight driving of the focus lens in the first direction is forbidden even though a drive direction judged on the basis of a further subsequently calculated third evaluation value is the first direction and the slight driving of the focus lens in the second direction is continuously performed,
wherein the slight driving of the focus lens in the first direction is not forbidden when a drive amount of the focus lens in the second direction which is calculated based on the second evaluation value exceeds the predetermined drive amount, and the drive direction is repeatedly judged by slightly driving the focus lens in the first direction, and
wherein the focus lens is determined to be in focus when a sum of a number of times when the drive direction of the slight driving of the focus lens is changed from the first direction to the second direction and a number of the times when the drive direction is changed from the second direction to the first direction becomes a predetermined value.

7. The focus adjustment method according to claim 6, wherein the slight driving of the focus lens in the first direction is forbidden for a predetermined time.

8. The focus adjustment method according to claim 6, wherein the predetermined value is a drive amount of the focus lens corresponding to the focal depth of the imaging lens.

9. The focus adjustment method according to claim 6, further comprising determining that the focus lens is in focus when the judgment of the drive direction is not determined and when the first evaluation value calculated after the focus lens is kept slightly driven in the first direction is equal to or more than a predetermined value.

10. The focus adjustment method according to claim 6, wherein after determining that the focus lens is in focus, the focus lens is moved to a location between the position of the focus lens when the direction is changed from the first direction to the second direction and the position of the focus lens when the direction is changed from the second direction to the first direction.

11. A non-transitory storage medium storing a computer-readable focus adjustment program to be executed by a focus adjustment computer on the basis of an image signal from an imager which receives a light flux passing through an imaging lens including a focus lens and then generates the image signal, the focus adjustment program comprising:
calculating an evaluation value based on an image signal of a focus detection region set in a region of the imager where the light flux is received, thereby judging a drive direction of the focus lens to be in focus based on a difference of an evaluation value of a different position of the focus lens; and
controlling a focus adjustment operation on the basis of the judged drive direction,
wherein the drive direction is repeatedly judged, and after the focus lens is slightly driven in a first direction judged on the basis of a first evaluation value and then the focus lens is slightly driven in a second direction different from the first direction on the basis of a subsequently calculated second evaluation value, when a drive amount of the focus lens in the second direction which is calculated based on the second evaluation value does not exceed a predetermined drive amount, the slight driving of the focus lens in the first direction is forbidden even though a drive direction judged on the basis of a further subsequently calculated third evaluation value is the first direction and the slight driving of the focus lens in the second direction is continuously performed,
wherein the slight driving of the focus lens in the first direction is not forbidden when a drive amount of the focus lens in the second direction which is calculated based on the second evaluation value exceeds the predetermined drive amount, and the drive direction is repeatedly judged by slightly driving the focus lens in the first direction, and
wherein the focus lens is determined to be in focus when a sum of a number of times when the drive direction of the slight driving of the focus lens is changed from the first direction to the second direction and a number of the times when the drive direction is changed from the second direction to the first direction becomes a predetermined value.

12. The non-transitory storage medium according to claim 11, wherein the slight driving of the focus lens in the first direction is forbidden for a predetermined time.

13. The non-transitory storage medium according to claim 11, wherein the predetermined value is a drive amount of the focus lens corresponding to the focal depth of the imaging lens.

14. The non-transitory storage medium according to claim 11, wherein the focus adjustment program further comprises determining that the focus lens is in focus when the judgment of the drive direction is not determined and when the first evaluation value calculated after the focus lens is kept slightly driven in the first direction is equal to or more than a predetermined value.

15. The non-transitory storage medium according to claim 11, wherein after determining that the focus lens is in focus, the focus lens is moved to a location between the position of the focus lens when the direction is changed from the first direction to the second direction and the position of the focus lens when the direction is changed from the second direction to the first direction.

\* \* \* \* \*